United States Patent
Ylitalo et al.

(10) Patent No.: US 8,442,144 B2
(45) Date of Patent: *May 14, 2013

(54) CLOSED LOOP FEEDBACK SYSTEM FOR IMPROVED DOWN LINK PERFORMANCE

(75) Inventors: Juha Ylitalo, Oulu (FI); Marcos Katz, Oulu (FI)

(73) Assignee: Intellectual Ventures I LLC, Wilmington, DE (US)

( * ) Notice: Subject to any disclaimer, the term of this patent is extended or adjusted under 35 U.S.C. 154(b) by 243 days.

This patent is subject to a terminal disclaimer.

(21) Appl. No.: 12/872,193

(22) Filed: Aug. 31, 2010

(65) Prior Publication Data

US 2010/0322337 A1 Dec. 23, 2010

Related U.S. Application Data

(60) Continuation of application No. 11/068,855, filed on Mar. 2, 2005, now Pat. No. 7,844,010, which is a division of application No. 09/586,561, filed on Jun. 2, 2000, now Pat. No. 7,139,324.

(51) Int. Cl.
*H04B 7/02* (2006.01)

(52) U.S. Cl.
USPC ........... 375/267; 375/136; 375/135; 375/146; 375/259; 375/271; 375/279; 375/295; 375/299; 375/302; 375/308; 375/316; 375/322; 375/329; 375/347; 375/349; 455/127.1; 455/522; 455/562.1

(58) Field of Classification Search .......... 375/135–136, 375/146–147, 259, 267, 271, 279, 295, 299, 375/302, 308, 316, 322, 329, 347, 349; 455/127.1, 455/522, 562.1

See application file for complete search history.

(56) References Cited

U.S. PATENT DOCUMENTS

| | | | |
|---|---|---|---|
| 5,216,692 A | * | 6/1993 | Ling .............................. 375/130 |
| 5,274,844 A | | 12/1993 | Harrison et al. |
| 5,613,219 A | | 3/1997 | Vogel et al. |
| 5,825,807 A | | 10/1998 | Kumar |
| 5,848,103 A | | 12/1998 | Weerackody |
| 5,856,804 A | | 1/1999 | Turcotte et al. |
| 5,936,569 A | | 8/1999 | Stanghle et al. |
| 5,999,826 A | | 12/1999 | Whinnett |

(Continued)

FOREIGN PATENT DOCUMENTS

| | | |
|---|---|---|
| EP | 0 795 970 | 9/1997 |
| EP | 0 969 610 | 1/2000 |
| EP | 1 003 297 | 5/2000 |
| WO | WO-98/09381 | 3/1998 |

OTHER PUBLICATIONS

3G TS 25.214, Mar. 2000, v3.2.0, pp. 26-31.

(Continued)

*Primary Examiner* — Daniel Washburn
*Assistant Examiner* — Rahel Guarino

(57) ABSTRACT

A method includes receiving from a first station at a second station at least two space-time coded signals in respective formed beams of a multi-beam antenna array associated with the first station; receiving from the first station, in a signaling channel, a value representing a transmit power level; determining power control coefficients for each of the space-time coded signals; and transmitting the power control coefficients to the first station, wherein the control coefficients are for in part adjusting transmit power.

31 Claims, 25 Drawing Sheets

U.S. PATENT DOCUMENTS

| | | | |
|---|---|---|---|
| 6,067,290 A | 5/2000 | Paulraj et al. | |
| 6,128,330 A | 10/2000 | Schilling | |
| 6,131,016 A | 10/2000 | Greenstein et al. | |
| 6,173,162 B1* | 1/2001 | Dahlman et al. | 455/69 |
| 6,185,440 B1 | 2/2001 | Barratt et al. | |
| 6,198,775 B1 | 3/2001 | Khayrallah et al. | |
| 6,232,921 B1 | 5/2001 | Aiken et al. | |
| 6,240,071 B1* | 5/2001 | Willenegger et al. | 370/311 |
| 6,249,683 B1* | 6/2001 | Lundby et al. | 455/522 |
| 6,285,886 B1* | 9/2001 | Kamel et al. | 455/522 |
| 6,298,035 B1 | 10/2001 | Heiskala | |
| 6,307,882 B1 | 10/2001 | Marzetta | |
| 6,314,305 B1 | 11/2001 | Solondz et al. | |
| 6,317,411 B1 | 11/2001 | Whinnett et al. | |
| 6,348,389 B1 | 2/2002 | Chou et al. | |
| 6,351,499 B1 | 2/2002 | Paulraj et al. | |
| 6,377,632 B1 | 4/2002 | Paulraj et al. | |
| 6,377,819 B1 | 4/2002 | Gesbert et al. | |
| 6,385,181 B1 | 5/2002 | Tsutsui et al. | |
| 6,400,780 B1 | 6/2002 | Rashid-Farrokhi et al. | |
| 6,438,389 B1 | 8/2002 | Sandhu et al. | |
| 6,473,393 B1 | 10/2002 | Ariyavisitakul et al. | |
| 6,501,803 B1 | 12/2002 | Alamouti et al. | |
| 6,515,978 B1 | 2/2003 | Buehrer et al. | |
| 6,542,556 B1 | 4/2003 | Kuchi et al. | |
| 6,542,736 B1 | 4/2003 | Parkvall et al. | |
| 6,546,236 B1 | 4/2003 | Canada et al. | |
| 6,549,544 B1 | 4/2003 | Kroeger et al. | |
| 6,584,302 B1 | 6/2003 | Hottinen et al. | |
| 6,584,593 B1 | 6/2003 | Seshadri et al. | |
| 6,594,473 B1 | 7/2003 | Dabak et al. | |
| 6,615,024 B1 | 9/2003 | Boros et al. | |
| 6,621,877 B1 | 9/2003 | Arviv et al. | |
| 6,658,262 B1* | 12/2003 | Lundborg | 455/522 |
| 6,690,944 B1* | 2/2004 | Lee et al. | 455/522 |
| 6,724,828 B1 | 4/2004 | Dabak | |
| 6,778,507 B1 | 8/2004 | Jalali | |
| 6,782,277 B1* | 8/2004 | Chen et al. | 455/562.1 |
| 6,788,661 B1 | 9/2004 | Ylitalo et al. | |
| 6,977,910 B1 | 12/2005 | Hosur et al. | |
| 7,139,324 B1 | 11/2006 | Ylitalo et al. | |
| 7,200,368 B1 | 4/2007 | Hottinen et al. | |
| 7,403,748 B1 | 7/2008 | Keskitalo et al. | |
| 2001/0014612 A1* | 8/2001 | Uesugi | 455/522 |
| 2003/0086478 A1* | 5/2003 | Lee et al. | 375/130 |
| 2003/0228850 A1 | 12/2003 | Hwang | |
| 2004/0116077 A1 | 6/2004 | Lee et al. | |
| 2005/0037718 A1 | 2/2005 | Kim et al. | |
| 2005/0157683 A1 | 7/2005 | Ylitalo et al. | |
| 2006/0234789 A1 | 10/2006 | Tarokh et al. | |
| 2008/0117961 A1* | 5/2008 | Han et al. | 375/227 |

OTHER PUBLICATIONS

3GPP RAN S1.14 V2.0.0, UTRA FDD; Physical layer procedures, Apr. 1999, pp. 1-32.

Communication from the European Patent Office on EP Patent 01934236.9, dated Sep. 11, 2006.

Communication from the European Patent Office on EP Application 04020209.5, dated Jan. 26, 2005.

European Search Report for EP Application 04020208.7, completed Oct. 27, 2004.

Heath Jr, et al: Paper entitled: Multiple Antenna Arrays for Transmitter Diversity and Space-Time Coding, 1999, pp. 36-40.

Hottinen, et al: Paper entitled: "Transmit Diversity Using Filtered Feedback Weights in the FDD/WCDMA System," IEEE, Feb. 15, 2000, pp. 15-21.

International Search Report for PCT/IB2001/00967 mailed on Jun. 21, 2002.

Jongren, et al: Paper entitled: "Combining Transmit Antenna Weights and Orthogonal Space-Time Block Codes by Utilizing Side Information, Signals, Systems, and Computers," IEEE, 1999, pp. 1562-1566.

Katz et al., "Extension of Space-Time Coding to Beam-forming WCDMA Base Stations," Vehicular Technology Conference Proceedings, V. 2, May 15, 2000, Tokyo, Japan, pp. 1230-1234.

Katz, Marcos and Ylitalo, Juha, "Beamspace-Time Coding Method for Downlink Performance Enhancement of CDMA Micro/Pico-cell Base Stations," Proceedings of Finnish Signal Processing Symposium, University of Oulu, Finland, May 31, 1999, pp. 25-29.

Notice of Allowance on U.S. Appl. No. 11/068,856, mailed Jan. 13, 2010.

Supplemental Notice of Allowability on U.S. Appl. No. 09/586,561, mailed Sep. 1, 2006.

Notice of Allowance on U.S. Appl. No. 11/068,855, mailed May 27, 2010.

Notice of Allowance on U.S. Appl. No. 11/068,856, mailed Feb. 23, 2010.

Notice of Allowance on U.S. Appl. No. 09/586,561, mailed Jul. 27, 2006.

Office Action on Japanese Application 2002-505768, mailed Oct. 26, 2010 (English translation included).

Office Action on U.S. Appl. No. 09/586,561 mailed Jun. 21, 2004.

Office Action on U.S. Appl. No. 09/586,561, mailed Apr. 21, 2005.

Office Action on U.S. Appl. No. 09/586,561, mailed Oct. 5, 2005.

Office Action on U.S. Appl. No. 09/586,561, mailed Apr. 4, 2006.

Office Action on U.S. Appl. No. 11/068,855, mailed Feb. 1, 2010.

Office Action on U.S. Appl. No. 11/068,855, mailed Sep. 28, 2009.

Office Action on U.S. Appl. No. 11/068,856, mailed Sep. 17, 2009.

Official Action from Canadian Patent Office for Canadian Application 2,525,146 dated Mar. 11, 2009.

Official Action from Canadian Patent Office for Canadian Application 2,526,118 dated Mar. 11, 2009.

Restriction Requirement on U.S. Appl. No. 09/586,561, mailed Feb. 9, 2004.

Rhee, Sang-Bin, "Vehicle Location in Angular Sectors Based on Signal Strength," IEEE Trans. Veh. Technol., V. VT-27 (Nov. 1978), pp. 244-258.

Usuda et al., "An Application of a Closed Loop Mode Transmit Diversity in W-CDMA Systems," The Institute of Electronics, Information and Communication Engineers, Technical Report, CS2000-7, vol. 100, No. 80 pp. 43-50, May 25, 2000 (English abstract only).

Von Ramm, Olaf T. and Smith, Stephen W., "Bean Steering with Linear Arrays," IEEE Transactions on Biomedical Engineering, Aug. 1983, pp. 438-452, vol. BME-30, No. 8.

Wichman, et al: Paper entitled: "Transmit Diversity in the WCDMA System," International Journal of Wireless Information Networks, vol. 6, No. 3, 1999, pp. 171-180.

Decision of Rejection issued on Japanese Application 2002-505768, mailed Mar. 29, 2011 (with English translation).

* cited by examiner

CLOSED LOOP FEEDBACK SYSTEM FOR IMPROVED DOWN LINK PERFORMANCE

CROSS-REFERENCE TO RELATED PATENT APPLICATIONS

This application is a Continuation of U.S. application Ser. No. 11/068,855, filed Mar. 2, 2005, incorporated herein by reference in its entirety, which is a Divisional of U.S. application Ser. No. 09/586,561, filed Jun. 2, 2000, (now U.S. Pat. No. 7,139,324, issued Nov. 21, 2006) incorporated herein by reference in its entirety.

FIELD OF THE INVENTION

The present invention relates to a system to control down link signal transmission from a base station of a cellular radio system to a remote station. In particular, the invention relates to a closed loop phase and amplitude control system to adjust the phase and amplitude of down link transmitted signals.

DESCRIPTION OF RELATED ART

Cellular telephone systems are operated in environments that give rise to multi-path or reflections of their signals, particularly in urban environments. In FIG. 1, base station transmitter 1 broadcasts its signal to remote station 2 (often mobile) along direct path 3. However, owing to the presence of tall building 4, transmitter 1 also broadcasts its signal to remote station 2 along indirect path 5, thus, giving rise to angular spread AS between the direction of arrival of direct path 3 at remote station 2 and the direction of arrival of indirect path 5 at remote station 2. Direct path 3 and indirect path 5 are recombined at remote station 2 where constructive and destructive superimposed signals cause random or what appears to be random fading and black out zones.

To reduce the effects of multi-path, known systems employ space time transmit diversity techniques. In FIG. 2, a known transmitter includes space time transmit diversity encoder 10, complex multipliers 12 and 14, and antennas 16 and 18. Space time transmit diversity encoder 10 processes input signal $S_{IN}$ into two channel signals $CH_1$ and $CH_2$. Multipliers 12 and 14 may impart a same orthogonalizing code OC on the two channel signals $CH_1$ and $CH_2$ to identify the two channels as containing information about input signal $S_{IN}$; however, different orthogonal identifiers (e.g., pilot sequences or training sequences) are applied to the different antenna signals so that the remote station can separately identify the signals from the two antennas. The multiplied channel signals are transmitted on respective antennas 16 and 18 substantially spaced apart by a distance (e.g., 20 wavelengths). Such spaced apart antennas are referred to as diversity antennas. In multi-path environments severe fading results when different propagation paths sum destructively at the receiving antenna. Using diversity antennas, the probability that both signals $CH_1$ and $CH_2$ will be in deep fade is low since the two signals are likely to propagate over different paths such as the multi-paths 3 and 5. Diversity antennas may be omni-directional antennas or antennas directed at antenna sectors with overlayed sectors. When diversity antennas are sufficiently separated in space, they can be regarded as orthogonal since they propagate signals in non-correlated channels (i.e., paths).

Input signal $S_{IN}$ carries two symbols, $S_1$ and $S_2$, in time succession, the first symbol in symbol slot between 0 and T, and the second symbol in symbol slot between T and 2T. In FIG. 3, exemplary encoder 10 uses a QPSK modulation technique and includes time align register 20 and hold registers 22 to hold the two symbols. Base band carrier signal SBBC is inverted in inverter 24 to produce negative base band carrier −SBBC. QPSK modulator 26 encodes symbol $S_1$ onto base band carrier signal SBBC to produce a modulated first symbol, and QPSK modulator 28 encodes symbol $S_1$ onto negative base band carrier signal −SBBC to produce a modulated conjugate of the first symbol. QPSK modulator 30 encodes symbol $S_2$ onto base band carrier signal SBBC to produce a modulated second symbol, and QPSK modulator 32 encodes symbol $S_2$ onto negative base band carrier signal −SBBC to produce a modulated conjugate of the second symbol. The modulated conjugate of the second symbol is inverted in inverter 34 to produce a negative modulated conjugate of the second symbol. Analog multiplexer 36 switches the modulated first symbol into the first channel signal during the first symbol time slot (i.e., 0 to T, FIG. 2) and switches the negative modulated conjugate of the second symbol into the first channel signal during the second symbol time slot (i.e., T to 2T, FIG. 2) so that the signal on CH1 is $[S_1, -S_2^*]$. Analog multiplexer 38 switches the modulated second symbol into the second channel signal during the first symbol time slot (i.e., 0 to T, FIG. 2) and switches the modulated conjugate of the first symbol into the second channel signal during the second symbol time slot (i.e., T to 2T, FIG. 2) so that the signal on CH2 is $[S_1, -S_2^*]$.

In FIG. 2, code OC consists of one code applied to both multipliers 12, 14 that is used as a CDMA spreading function to isolate the two signals transmitted from antennas 16 and 18 from other signals that may generate co-channel interference. Multipliers 12 and 14, multiply the first and second channel signals before being transmitted through antennas 16 and 18. RF up converters are not shown for simplicity.

At remote station 2, a receiver receives signals from both antennas 16 and 18 on a single antenna, down-converts the signals, despreads the signals using code OC, and recovers a composite of channels CH1 and CH2 as transmitted from antennas 16 and 18, respectively. In the first symbol time slot between 0 and T, the composite QPSK modulated signal $R_1$ is received (where $R_1 = k_{11}S_1 + k_{12}S_2$), and in the second symbol time slot between T and 2T, the composite QPSK modulated signal $R_2$ is received (where $R_2 = -k_{21}S_2^* + k_{22}S_1^*$ and the asterisk refers to a complex conjugate). Constant $k_{11}$ is a transmission path constant from first antenna 16 to remote station 2 during the first time slot, constant $k_{12}$ is a transmission path constant from second antenna 18 to remote station 2 during the first time slot, constant $k_{21}$ is a transmission path constant from first antenna 16 to remote station 2 during the second time slot, and constant $k_{22}$ is a transmission path constant from second antenna 18 to remote station 2 during the second time slot. The receiver derotates the channel to recover soft symbols $S_1'$ and $S_2'$, where $$S_1' = K_{11}R_1 + k_{12}R_2 \text{ and } S_2' = k_{21}R_2^* + k_{22}R_1.$$

In this time space encoder technique, the first and second symbols are redundantly transmitted from separate antennas. The first symbol is encoded to be transmitted in both the first and second symbol time slots, and the second symbol is also encoded to be transmitted in both the first and second symbol time slots. The effect of this symbol recovery technique is that fading or drop out regions that may appear during one symbol time slot are less likely to appear during both symbol time slots when interleaving is also exploited. Interleaving is used before space-time coding to make adjacent bits less correlated in time. Since the received symbols are recovered from received signals during both time slots, $R_1$ and $R_2$, the effect of fading is diminished.

However, the prior art does not exploit advantages provided by independent power and phase management of individual beams transmitted by different diversity type antennas to achieve greater spectral efficiency at the base station while minimizing co-channel interference. The prior art does not exploit advantages provided by spatial power management of independently directed beams to achieve greater spectral efficiency at the base station while minimizing co-channel interference.

SUMMARY OF THE INVENTION

It is an object to the present invention to improve the down link performance of a cellular radio system. It is another object to minimize undesired effects of fading and drop out.

These and other objects are achieved with a method that includes receiving at least two space-time coded signals from an antenna system associated with a first station, determining complex channel state information based on the received space-time coded signals, and sending the complex channel state information to the first station.

These and other objects are achieved with an alternative embodiment where the method includes transmitting at least two space-time coded signals in respective beams of a multi-beam antenna array, measuring a channel impulse response for each space-time coded signal at a second station, and sending an indicia of a selected set of least attenuated signals from the second station to the first station. The multi-beam antenna array is associated with a first station. The beams transmit a signature code embedded in each respective space-time coded signal, and the signature codes are orthogonal so that the second station can separate and measure the channel impulse response corresponding to each space-time coded signal. The space-time coded signals include the selected set of least attenuated signals and a remaining set of most attenuated signals.

These and other objects are achieved with an alternative embodiment where the method includes selecting at least two beams of plural beams formed by a multi-beam antenna array associated with a first station for transmission of at least two space-time coded signals produced by a space-time encoder, determining a time delay associated with each of the at least two space-time coded signals as received in each respective beam, and setting into a variable delay line the time delay corresponding to each beam, each variable delay line being coupled between the multi-beam antenna array and the space-time encoder.

BRIEF DESCRIPTION OF THE DRAWINGS

The invention will be described in detail in the following description of preferred embodiments with reference to the following figures wherein.

DETAILED DESCRIPTION OF THE PREFERRED EMBODIMENTS

To achieve greater spectral efficiency of transmissions from the base station while minimizing co-channel interference, independent power management of individual beams transmitted by different antennas of the diversity antennas has been developed, and beamspace time encoder techniques have been developed to exploit angle of arrival diversity and exploit spatial power management of independently directed beams. Beamspace time techniques differ from known space time encoder techniques by its use of two or more independently directed orthogonal beams to exploit power and beam width management and angle of arrival diversity. Orthogonal beams are separately identifiable to the receiver by using perpendicular polarization (two beam case), by using a different pilot code for each beam in a CDMA system in addition to the CDMA spread spectrum code that is common to all beams, by using a different spread spectrum code for each beam in a CDMA system without pilot codes, by using a different training sequence (e.g., pilot code) multiplexed into each beam in a TDMA system. Persons skilled in the art will appreciate that there are other orthogonal beam techniques not listed above or techniques that use different combinations of the above techniques that are equivalent for providing a means for the receiver at the remote station to separately identify the individual beams and recover the signals they carry.

Power management techniques to transmit different powers in different orthogonal beams improve spectral efficiency at the base station on a system wide basis by minimizing co-channel interference even when this power management control is applied to overlaid sector directed beams or omni directional beams of diversity antennas. However, with orthogonally coded beams that are directed differently, spatial power management of independently directed beams provides even further improvements. The relatively poor downlink performance of radio environments with large angular spreads is significantly improved by applying the beamspace time encoder techniques described herein.

Figure 4:
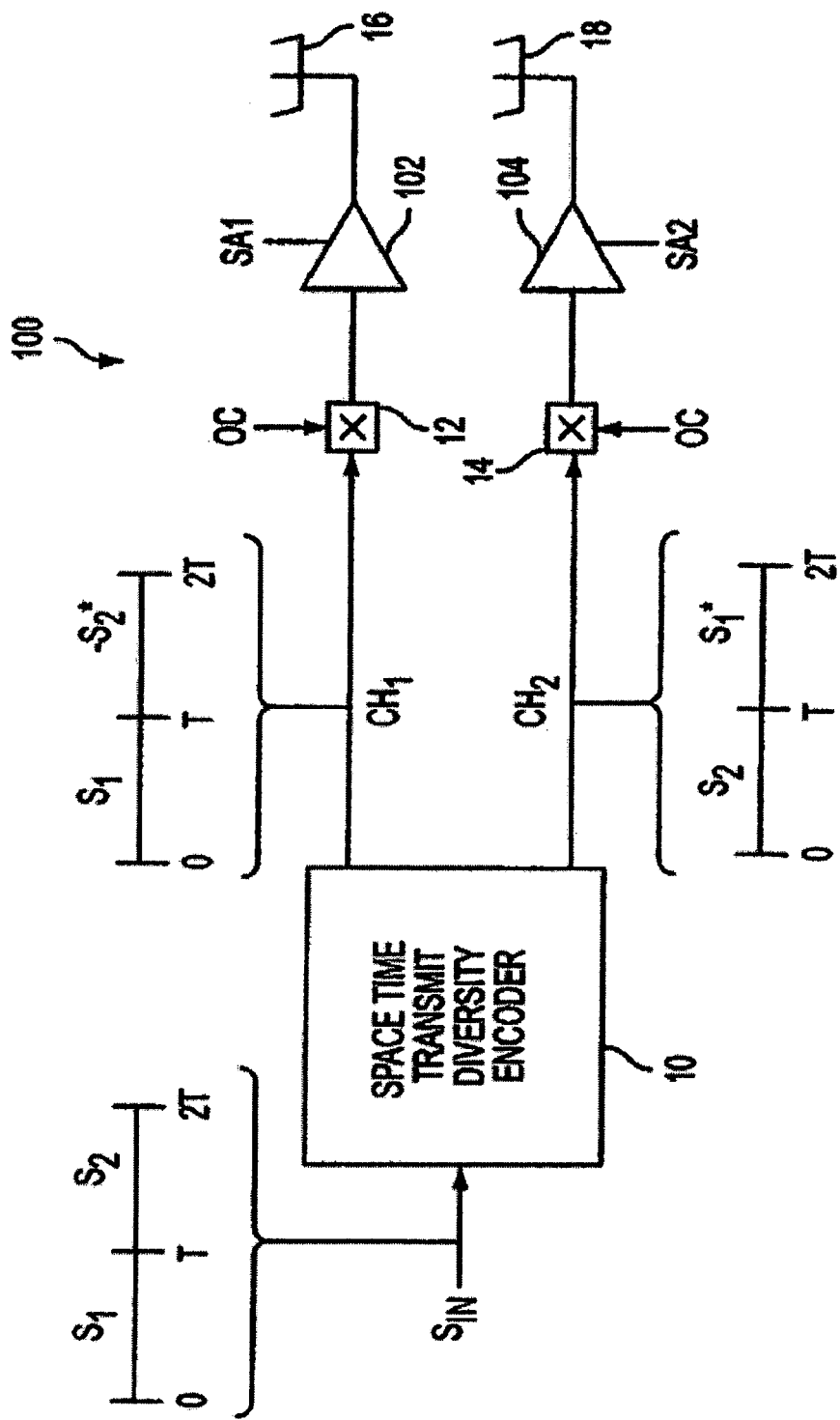
FIG. 4 is a block diagram of a base station apparatus according to an embodiment of the present invention.

In FIG. 4, a first embodiment of an improved transmitter 100 (referred to as power management of diversity antennas) includes known space time transmit diversity encoder 10 and complex multipliers 12 and 14. Improved transmitter 100 further includes scaling amplifiers 102 and 104 and diverse antennas 16 and 18. In a CDMA system, multipliers 12, 14 impart different spread spectrum codes to different beams so that a receiver at remote station 2 can discern the beams separately.

Although separate distinguishable spreading codes in a CDMA system are applied to multipliers 12, 14 as described here to create the orthogonal beams, it will be appreciated that any means to create orthogonal beams enable the separate power management of the transmissions from the diversity antennas (i.e., overlaid coverage), or from controllable directional antennas for that matter. For example, in a CDMA system where the multipliers 12 and 14 are provided with the same spreading codes, another set of multipliers 12' and 14' (not shown) may be used for imparting pilot codes to the channel signals. Multipliers 12' and 14' are then provided with orthogonal pilot codes so the receiver in remote station 2 can separately discern the beams. In another variant, antennas 16 and 18 are constituted by a single antenna with two exciter elements arranged to generate two beams that are orthogonally polarized (e.g., polarized at a +/−45 degree slant to the vertical or some other reference), but otherwise cover the same sector. Such beams are orthogonal, and transmissions over the respective signal paths experience uncorrelated fading.

Scaling control signals SA1 and SA2 separately control the amplification or attenuation achieved by separate scaling amplifiers 102 and 104, respectively. Scaling control signals SA1 and SA2 may be real to scale amplitudes, or imaginary to shift phases or complex with both real and imaginary components to both scale amplitudes and shift phases. It will be appreciated that the amplification may be applied at the output of encoder 10, before multipliers 12 and 14, after multipliers 12 and 14 or in antennas 16 and 18.

Antennas 16, 18 are diversity antennas that cover overlaid sectors or are omni-directional. This first embodiment differs from known space-time coded systems in that the power transmitted in each beam is separately controlled by SA1 and SA2.

Figure 5:
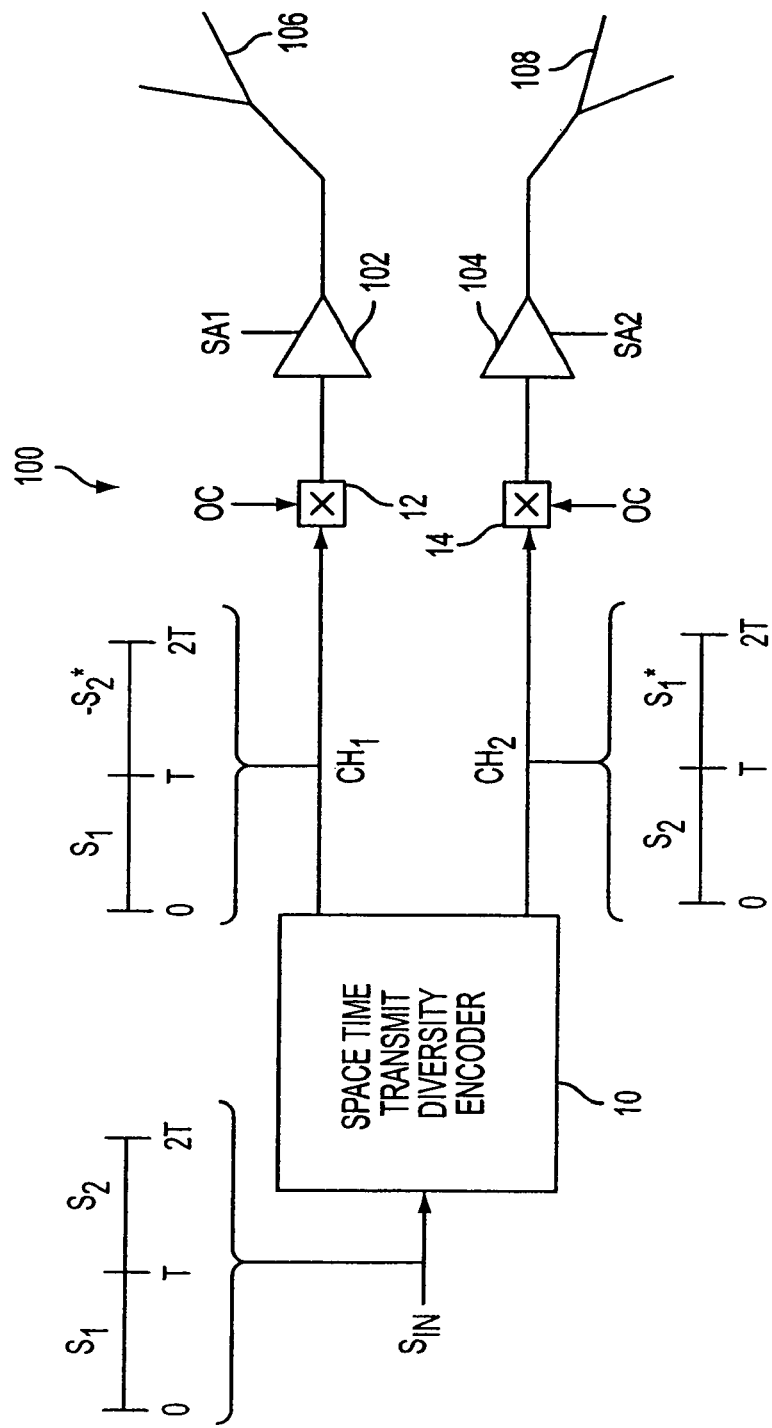
FIG. 5 is a block diagram of a base station apparatus according to another embodiment of the present invention.

In FIG. 5, a second embodiment of an improved transmitter 100 (referred to as angular spectral power management) includes known space time transmit diversity encoder 10 and complex multipliers 12 and 14. Improved transmitter 100 further includes scaling amplifiers 102 and 104 and controlled directional antennas 106 and 108. Unlike antennas 16 and 18 of FIG. 2, directional antennas 106 and 108 are directed toward direct path 3 and indirect path 5 (FIG. 1) or some other direction to cover angular spread AS or that portion of the angular power spectrum that exceeds a threshold as described herein. In a CDMA system, multipliers 12, 14 impart different spread spectrum codes to different beams or use other means so that a receiver at remote station 2 can discern the beams separately as described for the first embodiment using diversity antennas. Scaling control signals SA1 and SA2 separately control the amplification or attenuation achieved by separate scaling amplifiers 102 and 104, respectively. Scaling control signals SA1 and SA2 may be real to scale amplitudes, or imaginary to shift phases or complex with both real and imaginary components to both scale amplitudes and shift phases. It will be appreciated that the amplification may be applied at the output of encoder 10, before multipliers 12 and 14, after multipliers 12 and 14 or in antennas 106 and 108. Although separate spreading codes in a CDMA system are applied to multipliers 12, 14 as described here to create the orthogonal beams, it will be appreciated that any means to create orthogonal beams enable the separate power management of the transmissions from the controlled directional antennas (i.e., directions selected as described herein).

In a third embodiment (referred to as directional diversity and not separately shown), amplifiers 102 and 104 of FIG. 5 are removed from transmitter 100 so that no differential amplification is achieved, and both channels CH1 and CH2 have balanced and equal amplification, but their signals are transmitted directionally through controlled directional antennas 106 and 108.

Figure 6:
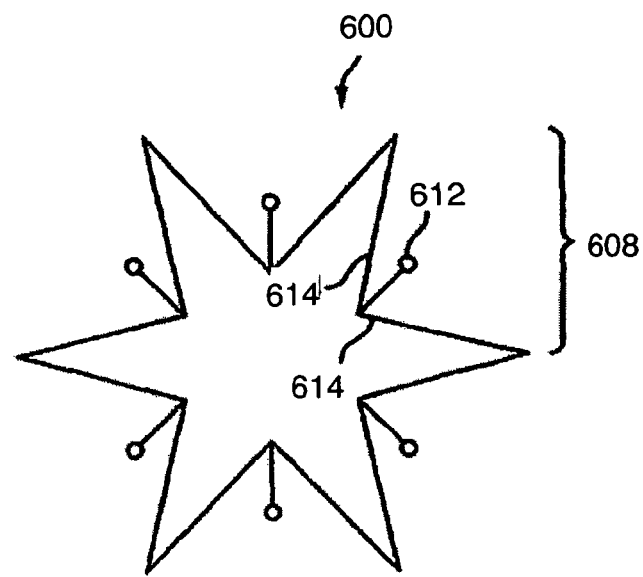
FIG. 6 is a schematic diagram of a known hex corner reflector antenna system.

There are several means to implement controlled directional antennas. In FIG. 6, known hex controlled directional antenna system 600 includes six co-sited corner reflector antennas, such as corner reflector antenna 608, arranged in a circle and all depicted in plan view. Each corner reflector antenna 608 includes a single half wave dipole 612 as an exciter element and corner reflectors 614. Each corner reflector antenna 608 illuminates a 60 degree beam width in plan view. Hex diversity antenna system 600 has been shown to provide angle location information that gives the bearing angle from a base station to the remote station based on received signal strength at 820 MHz (Rhee, Sang-Bin, "Vehicle Location In Angular Sectors Based On Signal Strength", IEEE Trans. Veh. Technol., vol. VT-27, pp 244-258, November 1978). Such co-sited corner reflector antennas could divide a 360 degree coverage into three sectors (120 degree antennas), four sectors (90 degree antennas), five sectors (72 degree antennas), eight sectors (45 degree antennas), or any convenient number of sectors that may be realizable.

Figure 1:
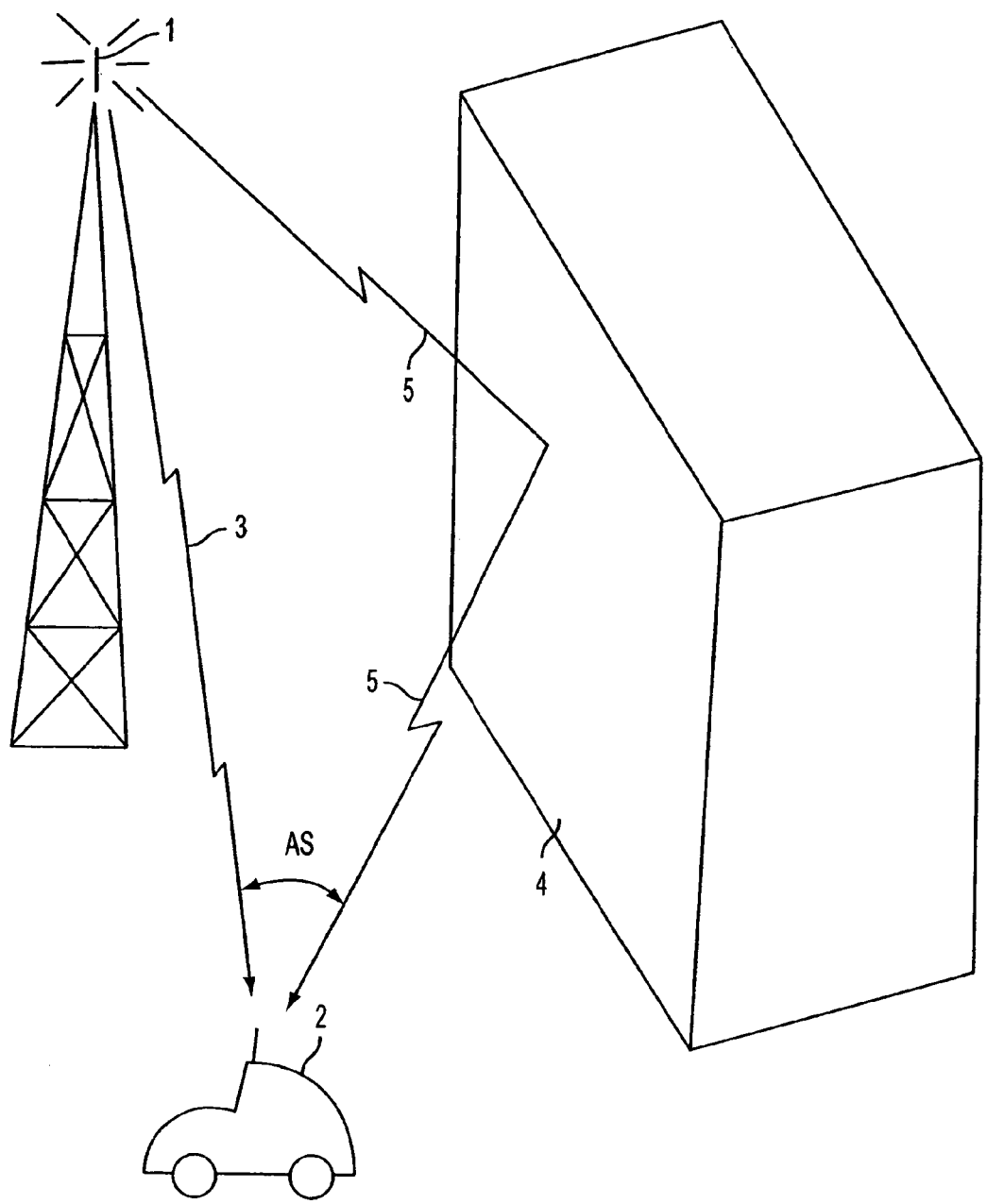
FIG. 1 is a schematic view of the radio environment in which the present invention is employed.

In the second and third embodiments of the present invention, a controlled directional antenna system is used for cellular radio transmitter 1 (FIG. 1). A controlled directional antenna system is defined as being capable of providing two or more distinguishable and separately controllable beams. It may be a single antenna with two or more exciter elements arranged to generate two or more beams (e.g., arranged to generate two discernable beams respectively polarized at a +/−45 degree slant to the vertical, but otherwise cover the same sector). It may be a multi-antenna system to generate beams that cover different sectors. For example, the controlled directional antenna system may advantageously be a hex corner reflector system, such as the antenna system depicted in FIG. 6. The controlled directional antenna system is used in a receive mode to determine the angle location of remote station 2 based on a signal transmitted from remote station 2. The two sectors with the strongest received signals are identified as the likely direction of arrival of direct path 3 and indirect path 5 (see FIG. 1). The antennas illuminating these two sectors are selected to be directional antennas 106 and 108 of the second and third embodiments of the present invention (FIGS. 4 and 5). Alternatively, the respective directions of arrival may be determined based on a calculation of the angular power spectrum as discussed below.

Figure 7:
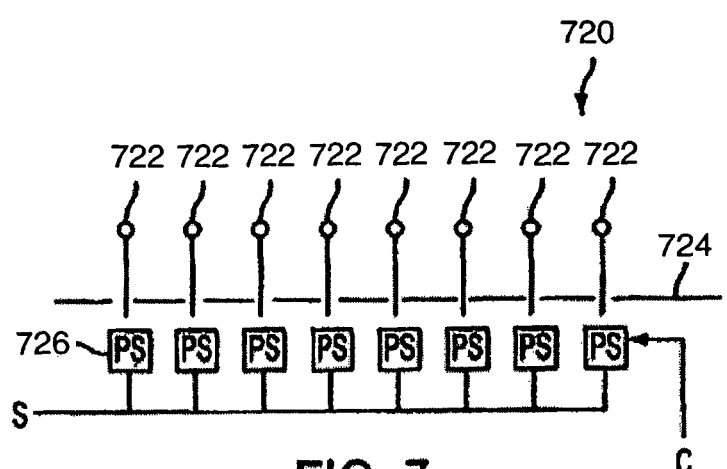
FIG. 7 is a schematic diagram of a known phase array antenna.

In FIG. 7, known steerable beam phased array antenna 20 includes an array of exciter elements 722 (e.g., half wave dipole) disposed to be spaced from ground plane or reflector plane 724. FIG. 7 depicts eight radiating elements, but more or fewer elements may be used. Each exciter element 722 is fed with a signal from a corresponding phase shifter 726. Each phase shifter 726 alters the phase and attenuates (or amplifies) the amplitude of signal S according to a corresponding individual control portion of control signal C. For example, control signal C includes 8 phase shift parameters and 8 attenuation parameters. Each phase and amplitude parameter individually controls the phase and amplitude radiated from a corresponding element of the eight exciter elements of antenna 720. The angular beam width of such an antenna is limited by the ratio of the wavelength of the signal being radiated divided by the aperture dimension D; however, by controlling signal amplitudes on exciter elements 722 as distributed across the antenna with what is called a weighting function, the beam may be shaped to broaden the beam, flatten the center of the beam and/or suppress side lobes. By controlling the gradient of the phase at the exciter elements across the antenna, the beam may be electronically directed to point in a controlled direction.

Figure 8:
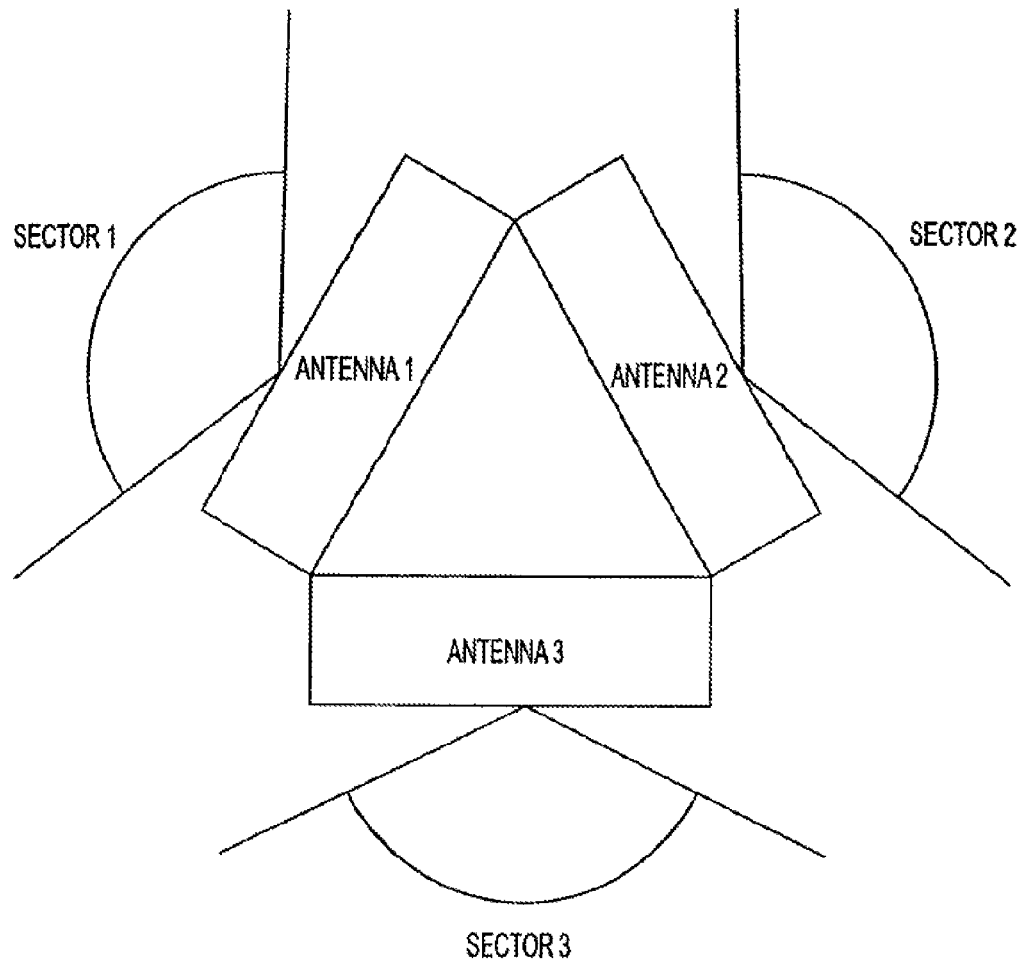
FIG. 8 is a schematic diagram in plan view of an exemplary three sector antenna system.

In a variant of the second and third embodiments, the antenna system for transmitter 1 (FIG. 1) includes plural phased array antennas 720 organized in a multi-antenna system. In FIG. 8, an exemplary multi-antenna system may include three antennas (taken to be phased array antennas 720) arranged to point outward in equally spaced angular direction so that the three phased array antennas 720 are formed into the antenna system at the base station. Each antenna 720 is designed to cover a 120 degree sector. The base station locates the remote station by electronically scanning antenna 720. Amplitude weights for each radiating element are preferably set to a maximum and are all equal so that the antenna provides its narrowest beam (most directional beam). The receive beam is scanned in steps by first computing the phase parameters for control signal C that represent a gradient in phase across the antenna to achieve a desired beam point, and then controlling antenna 720 to point in the desired direction. Second, a receiver at transmitter 1 (FIG. 1) detects any received signal strength. The steps of pointing a receive beam and detecting a signal strength are repeated at each of several beam positions until the entire sector covered by antenna 720 has been scanned. In this way, the angle location of remote station 2 is determined to a precision limited only by the narrowest achievable beam width of antenna 720. Once the location of direct path 3 and indirect path 5 are determined to be in different sectors (e.g., 120 degree sectors), antennas 106 and 108 (FIG. 5) are selected from the plural antennas 720 of the antenna system that are closest to direct path 3 and indirect path 5, and within the sector covered by each selected antenna 720, the phase gradients that define beams pointing at the angle locations for direct path 3 and for indirect path 5 are determined. Alternatively, when paths 3 and 5 lie in a single sector, two transmitting beams can be formed within the single sector to be directed along paths 3 and 5 if the antenna system is capable of forming the two beams in the single sector (see discussion below with respect to FIG. 10).

Figure 9:
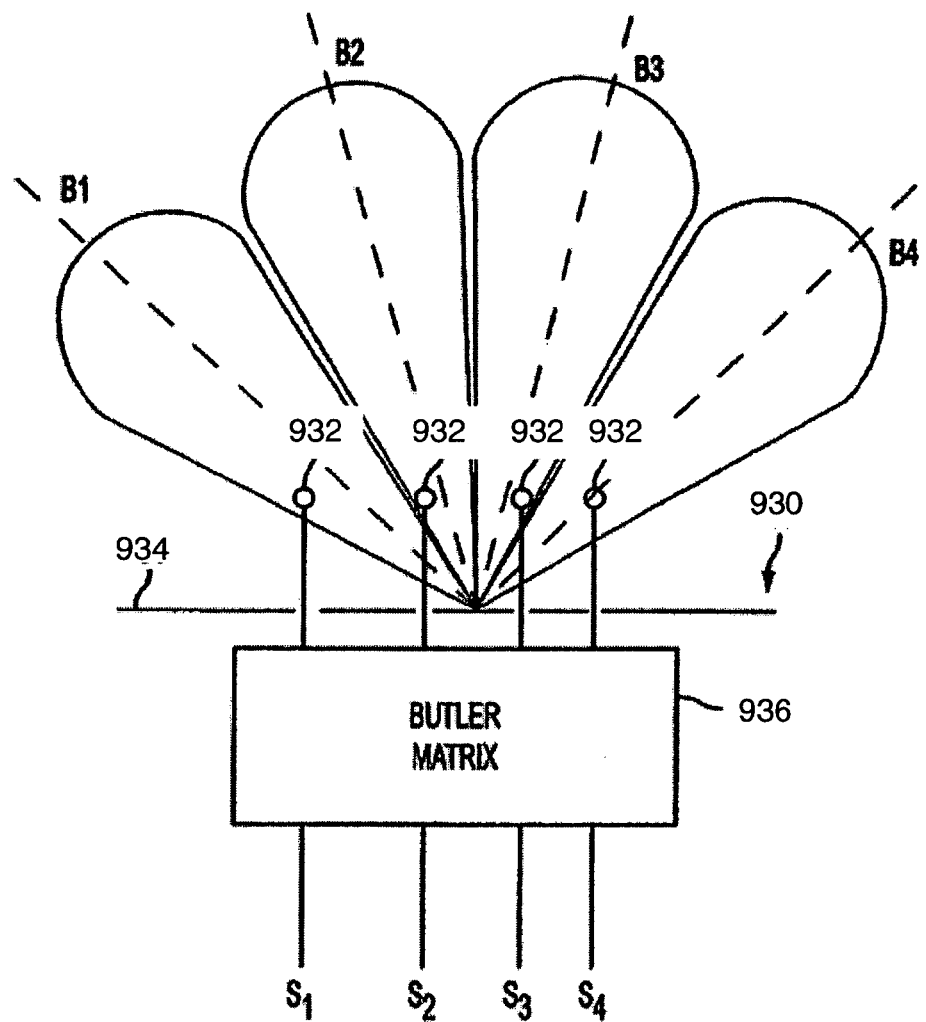
FIG. 9 is a schematic diagram of a known "Butler matrix" antenna.

In FIG. 9, antenna system 930 includes four radiating elements 932 disposed to be spaced from ground plane or reflector plane 934. Each radiation or exciter element 932 is fed with a signal from known Butler matrix 936. The Butler matrix provides phase shifting and combination functions that operate on signals S1, S2, S3 and S4 so that the radiation from the four exciter elements 932 combine to generate four fixed angularly directed and orthogonal beams B1, B2, B3 and B4. In general, a Butler matrix performs a Fourier processing function to feed M radiating elements so as to form M fixed and orthogonal beams ("angular bins"). For example, in antenna system 930, signal S1 is transmitted only in first beam B1, signal S2 is transmitted only in second beam B2, signal S3 is transmitted only in third beam B3, and signal S4 is transmitted only in fourth beam B4. A switching matrix may be used to direct desired signals (e.g., the signals CH1 and CH2 of FIG. 5) onto any of the lines for signals S1, S2, S3, and S4 and from there into respective beams B1, B2, B3 and B4.

In a variant of the second and third embodiments, the antenna system for transmitter 1 (FIG. 1) includes plural "Butler matrix" antennas 930 organized in a multi-antenna system. In FIG. 8, an exemplary multi-antenna system includes three antennas (taken here to be "Butler matrix" antennas 930) arranged to point outward in equally spaced angular direction so that the three "Butler matrix" antennas 930 are formed into the antenna system at the base station. Each antenna 930 is designed to cover a 120 degree sector with, for example, four beams. The base station locates the remote station by electronically switching between the four beams (each 30 degrees) of each of the three antennas 930 and detecting the signal strength received. In this way, the angle location of remote station 2 is determined to a precision of one beam width of antenna 930. Once the locations of direct path 3 and indirect path 5 are determined, antennas 106 and 108 (FIG. 5) are selected from the two different "Butler matrix" antennas 930 that make up the antenna system for transmitter 1 (FIG. 1) if direct path 3 and indirect path 5 lie in different sectors. The two particular "Butler matrix" antennas 930 are selected to cover the sectors that are closest to direct path 3 and indirect path 5, and from there, a particular beam within each selected antenna 930 is selected that most closely aligns with the path. Alternatively, antennas 106 and 108 may be selected to be different beams of the same "Butler matrix" antenna 930. Within the sector covered by each antenna 930, the beam pointing at the angle location for each of direct path 3 and indirect path 5 is selected by a switch matrix (not shown).

Figure 10:
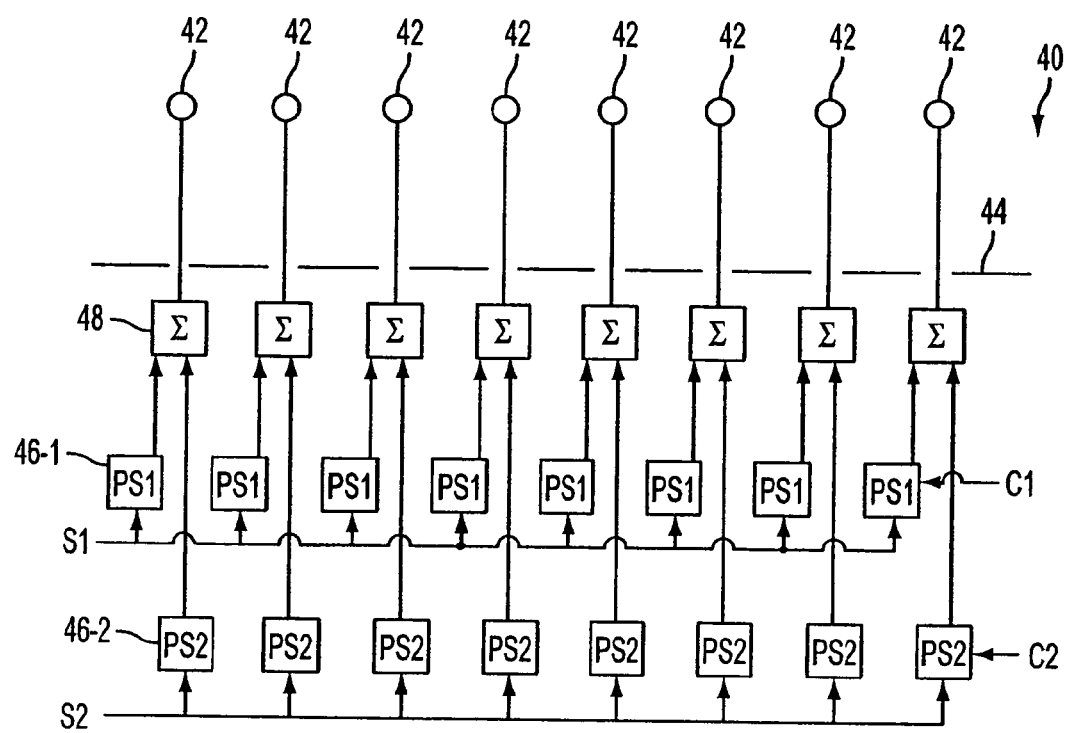
FIG. 10 is a schematic diagram of a dual beam phase array antenna.

In FIG. 10, antenna 40 is a modified version of phased array antenna 720 to provide two independently steerable and shapeable beams. Antenna 40 includes an array of exciter elements 42 (e.g., half wave dipole) disposed to be spaced from ground plane or reflector plane 44. FIG. 10 depicts eight radiating elements, but more or fewer elements may be used. However, unlike antenna 720, each exciter element in antenna 40 is fed by a signal from a corresponding summer 48. Each summer 48 superimposes (e.g., adds) signals from two corresponding phase shifters 46-1 and 46-2. All phase shifters 46-1 form a first bank of phase shifters, and all phase shifters 46-2 form a second bank of phase shifters. Each phase shifter 46-1 in the first bank alters the phase and attenuates (or amplifies) the amplitude of signal S1 according to a corresponding individual control portion of control signal C1. For example, control signal C1 includes 8 phase shift parameters and 8 attenuation parameters to individually control the phase and amplitude output from the corresponding phase shifter 46-1. Correspondingly, each phase shifter 46-2 in the second bank alters the phase and attenuates (or amplifies) the amplitude of signal S2 according to a corresponding individual control portion of control signal C2. For example, control signal C2 includes 8 phase shift parameters and 8 attenuation parameters to individually control the phase and amplitude output from the corresponding phase shifter 46-2. Summers 48 combine the outputs of respective phase shifters 46-1 and 46-2 and provide the combined signal to radiating elements 42. In this way, control signal C1 controls a first beam that radiates signal S1, and control signal C2 simultaneously controls a second beam that radiates signal S2.

In a variant of the second and third embodiments, the antenna system for transmitter 1 (FIG. 1) includes plural phased array antennas 40 organized in a multi-antenna system. In FIG. 8, an exemplary multi-antenna system includes three antennas (taken here to be phased array antennas 40) arranged to point outward in equally spaced angular direction so that the three phased array antennas 40 are formed into the antenna system at the base station. Each antenna 40 is designed to cover a 120 degree sector with two independently shapeable and steerable beams. The base station locates the remote station by electronically scanning a beam of antenna 40 as discussed above with respect to antenna 720 (FIG. 7). Once the location of direct path 3 and indirect path 5 are determined, antennas 106 and 108 (FIG. 5) are selected from the plural antennas 40 of the antenna system that are closest to direct path 3 and indirect path 5, and within the sector covered by each selected antenna 40, the phase gradients that define beams pointing at the angle location for direct path 3 and for indirect path 5 are determined.

Figure 11:
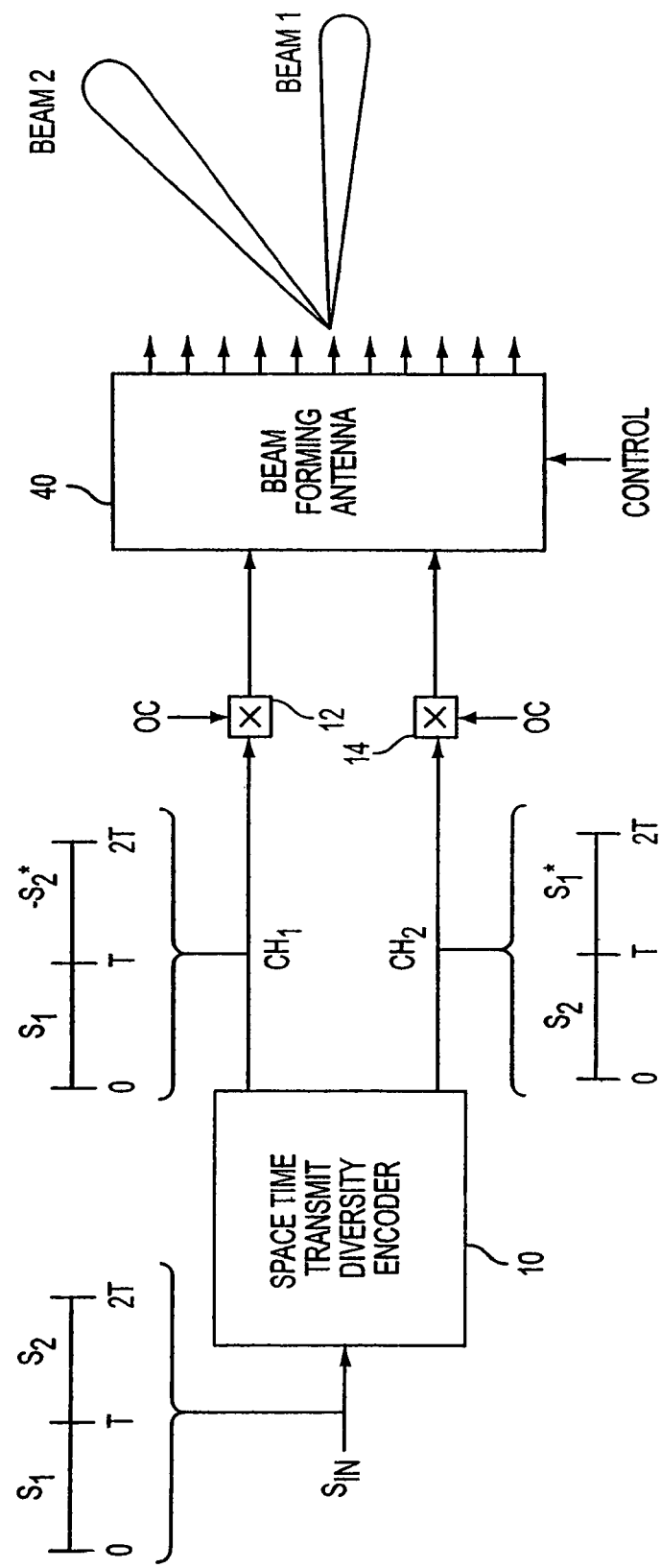
FIG. 11 is a block diagram of a base station apparatus according to another embodiment of the present invention.

Alternatively, antennas 106 and 108 may be selected to be different beams of the same dual beam antenna 40. In FIG. 11, antennas 106 and 108 (FIG. 5) are implemented in separate beams (i.e., beams 1 and 2) of dual beam antenna 40, and scaling amplifiers 102 and 104 (of FIG. 5) are not needed since the scaling function may be achieved by scaling the amplitude coefficients of control signals C1 and C2 (FIG. 10).

Figure 12:
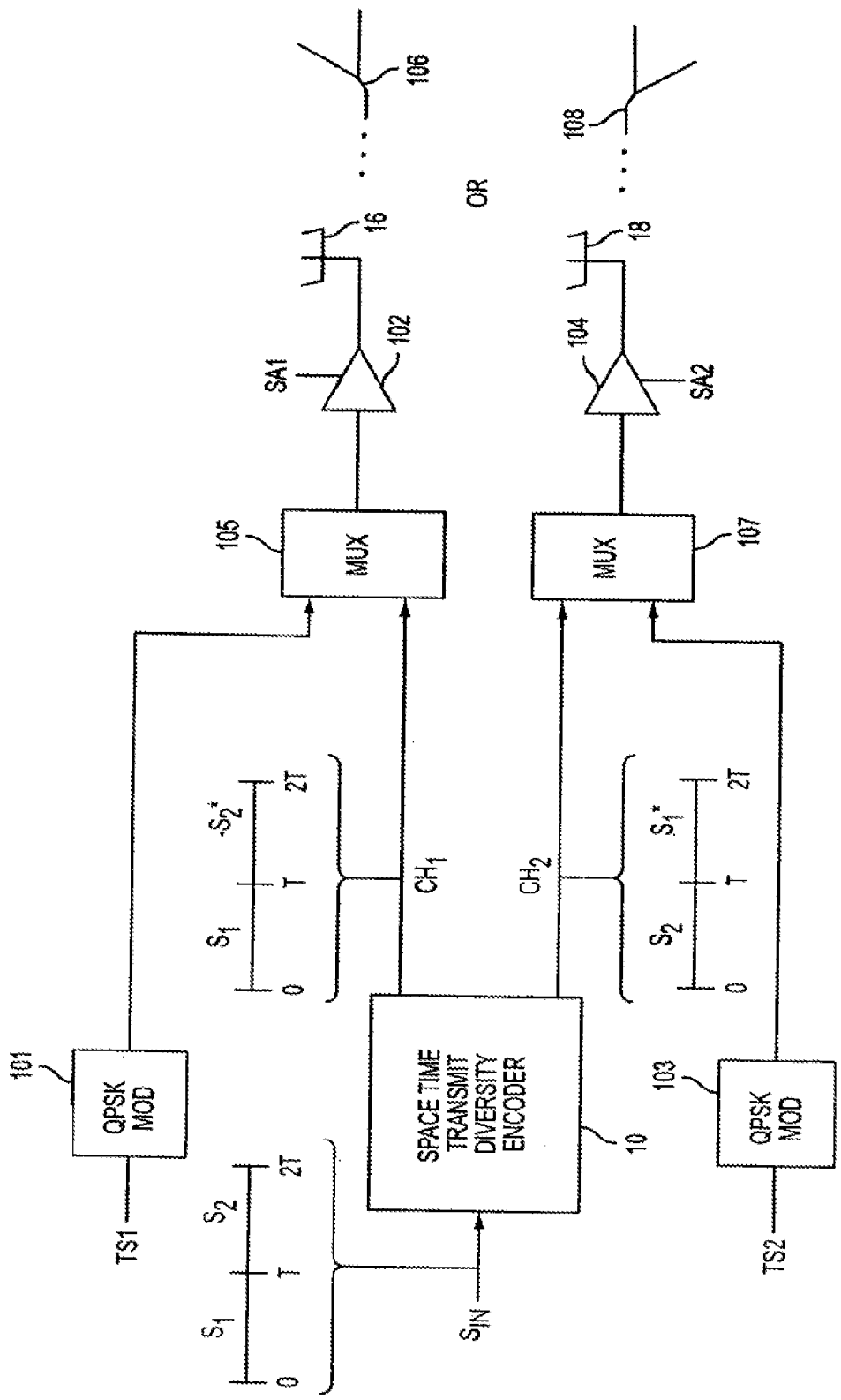
FIG. 12 is a block diagram of a TDMA base station apparatus according to another embodiment of the present invention.

In a fourth embodiment, the base station uses a time division multiple access (TDMA) transmitter instead of a spread spectrum CDMA transmitter. In FIG. 12, training sequence TS1 is modulated in QPSK modulator 101 and from there fed to a first input of multiplexer 105, and training sequence TS2 is modulated in QPSK modulator 103 and from there fed to a first input of multiplexer 107. Training sequences TS1 and TS2 are orthogonal and provide the means by which remote station 2 can discern between the beams in much the same way as pilot codes help distinguish beams in a CDMA system. In the TDMA system, multipliers 12 and 14 (of FIGS. 4, 5 and 11) are omitted and channel signals CH1 and CH2 are fed to second inputs to multiplexers 105 and 107, respectively. In this fourth embodiment, amplifiers 102 and 104 independently amplify or attenuate the outputs of respective multiplexers 105 and 107. The outputs of amplifiers 102 and 104 are fed to the antenna system (through up converters, etc., not shown). The antenna system may provide the overlaid coverage of diversity antennas 16, 18 (FIG. 4) as in the first embodiment or may provide controlled directional coverage of directional antennas 106, 108 (FIGS. 5 and 11) as in the second and third embodiments. Moreover, in the case of controlled directional coverage, a variant may be to forego power management and omit amplifiers 102, 104 and rely on angle (beam) diversity by steering beams from directional antennas 106, 108. A data slot in a time division system may include, for example, 58 data bits followed by 26 bits of a training sequence followed by 58 data bits as in a GSM system. The training sequence identifies the source of signal SIN and the individual beam to remote station 2 so that the remote station can separately discern the beams. In this way, remote station 2 can separately receive the two beams using the training sequences, instead of using orthogonal spreading codes OC as in a CDMA system.

Although two beams are discussed, extensions to higher order coding techniques with more beams are straightforward, for example, four symbols ($S_1, S_2, S_3, S_4$) encoded into four channel signals (CH1, CH2, CH3, CH4) in four symbol time slots so that the original symbols are recoverable from the encoded channel signals. The four channel signals are then transmitted from the base station in four beams, each beam corresponding to a channel signal of the channel signals CH1, CH2, CH3, and CH4. Although QPSK modulation techniques are discussed herein, extensions to other PSK modulation techniques are straightforward, and extensions to other modulation techniques (e.g., QAM) are equally useable.

Figure 13:
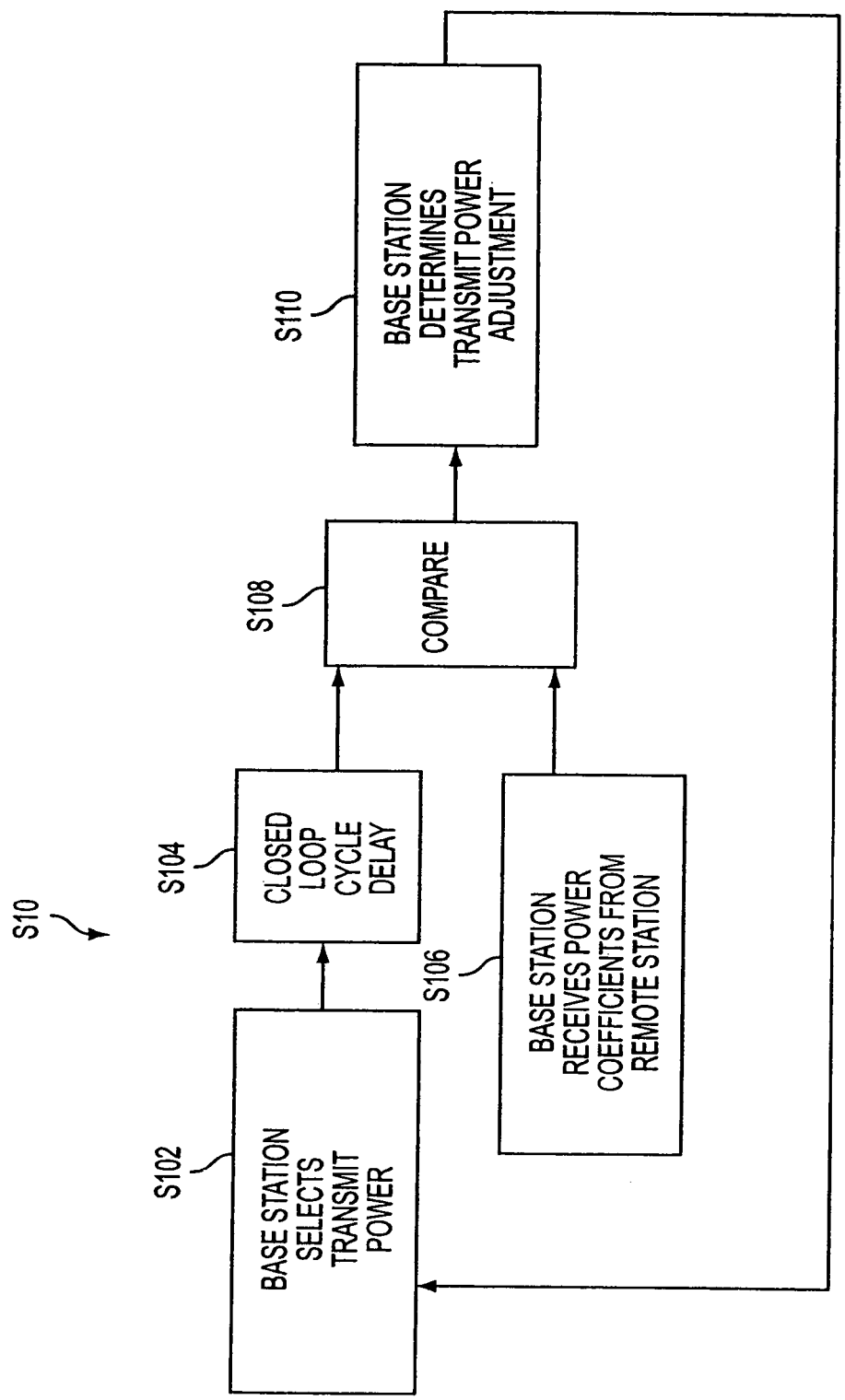
FIG. 13 is a block diagram of a closed loop beam power management system according to the present invention.

In FIG. 13, a closed loop control system to manage transmit powers is depicted as process S10. In step S102, the base station selects the power level to be transmitted from each antenna. For example, in a two antenna system, the base station selects powers P1 and P2 based on the total power (i.e., P1+P2) as defined by a conventional power control loop (e.g., a control loop typical to a CDMA system) and the relative powers (i.e., P1/P2) as defined by power control coefficients measured at remote station 2. In step S104, a value representing the selected transmit power level is sent to the remote station in a signaling channel. In step S106, the power level received at the remote station from each antenna radiation pattern is measured, and corresponding power control coefficients are determined. The power control coefficients for each antenna radiation pattern are determined at remote station 2 to be proportional to the received power at remote station 2 divided by the transmitted power as indicated by the power level value that is sent to the remote station in a signaling channel. In step 106 the power control coefficients are sent from the remote station to the base station in a signaling channel. In step S108, the power control coefficients from step S106 are compared for each antenna. In step S10, adjustments in transmit signal power are determined according to the comparison of step S108. The adjustments are made to increase transmit powers sent in channels that have favorable transmission qualities and reduce transmit powers in channels that have poor transmission qualities. Then, in step S102 at the beginning of the cycle, the base station selects adjusted transmit powers to form the basis for the powers to be transmitted from the antennas during the next cycle of the closed loop beam power management. The loop cycle delay may be one time slot as in a third generation TDMA system.

Alternatively, the remote station may compare (in step S108) the power control coefficients for each antenna from step S106 and then compute power coefficient indicator information to be sent from the remote station to the base station in an up link signaling channel. For example, a ratio of the power control coefficients (e.g., P1/P2 in a two antenna case) may be advantageously computed as the power coefficient indicator information and transmitted in the up link direction. Or the power coefficient indicator information may be the quantized value of the ratio (e.g., a single bit indicating whether P1>P2 or not).

Alternatively, in step S104, the selected transmit power is saved for a cycle time of the closed loop control system. For example, in a two antenna system, the base station selects powers P1 and P2 based on the total power (i.e., P1+P2) as defined by a conventional power control loop (e.g., a control loop typical to a CDMA system) and the relative powers (i.e., P1/P2) as defined by power control coefficients measured at remote station 2. In step S106, the power levels received at the remote station from each antenna radiation pattern are measured at remote station 2 and sent as power control coefficients in an up link signaling channel from remote station 2 to base station 1. The power control coefficients are normalized to their respective transmit powers as saved in step S104. In step S108, the normalized power control coefficients from step S106 are compared at the base station for each antenna. In step S110, adjustments in transmit signal power are determined according to the comparison of step S108. Then, in step S102 at the beginning of the cycle, the base station selects adjusted transmit powers to form the basis for the powers to be transmitted from the antennas during the next cycle of the closed loop beam power management.

Figure 14:
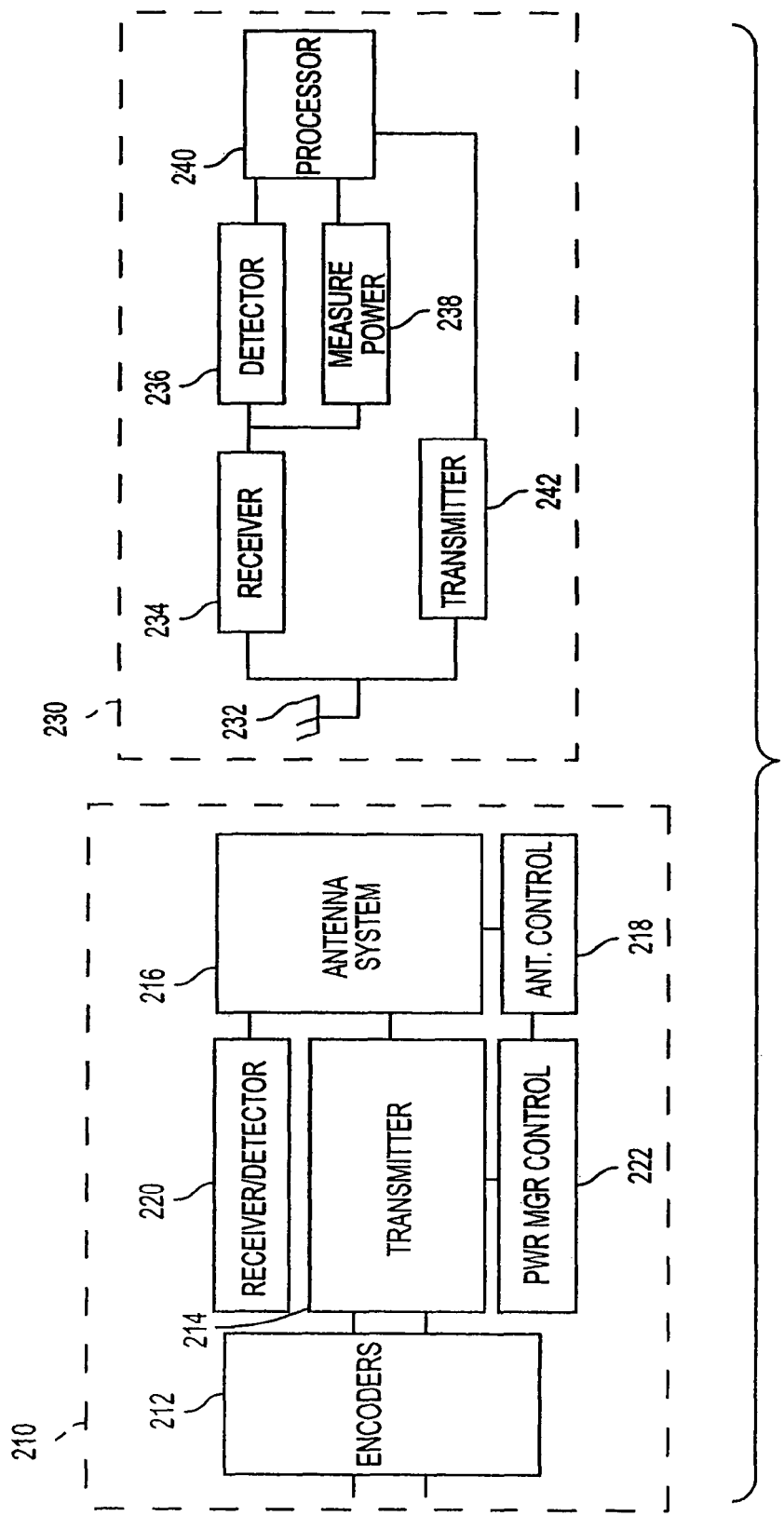
FIG. 14 is a block diagram of a radio system according the present invention.

In FIG. 14, a cellular radio system with closed loop beam power management controls includes base station 210 and remote station 230. Base station 210 includes space-time encoders 212 to encode a stream of symbols into first and second space-time coded signals, antenna system 216, transmitter 214 to transmit the first and second space-time coded signals at respective first and second initial transmit powers from the antenna system so as to form respective first and second radiation patterns, base station receiver 220 to receive power coefficient indicator information from the remote station, and power management controller 222 to determine first and second adjusted transmit powers based on the respective first and second initial transmit powers and the power coefficient indicator information.

Antenna system 216 may include plural antennas where each antenna is an antenna that generates either a substantially omni-directional radiation pattern or a radiation pattern directed to a sector. Omni-directional antennas are advantageously spaced apart. Antenna system 216 may form the first and second radiation patterns as orthogonal radiation patterns capable of being separately received at the remote station. Alternatively, transmitter 214 includes a circuit to process the first and second space-time coded signals so that the signals transmitted from the antenna system are orthogonal and can be separately received at the remote station.

Antenna system 216 is capable of generating plural beams (i.e., a multi-beam antenna) and the base station includes antenna control 218 to control the multi-beam antenna to form the plural beams. In one embodiment, the multi-beam antenna may be a multi-port Butler matrix antenna, and in this case, transmitter 214 will include amplifiers to scale the first and second space-time coded signals to form respective first and second scaled space-time coded signals based on the respective first and second adjusted transmit powers, and antenna control 218 will include a switch to couple the first and second scaled space-time coded signals into respective first and second input ports of the Butler matrix antenna to form the respective first and second beams.

Alternatively, the multi-beam antenna includes a phased array antenna system, and antenna control 218 includes a beam steering controller to form first and second weighting functions. The beam steering controller includes logic to input the first and second weighting functions into the phased array antenna system to scale antenna gains of the respective first and second beams based on the respective first and second adjusted transmit powers without scaling amplifiers in transmitter 214. The phased array antenna system may include either a plural beam phased array antenna (e.g., 40 of FIG. 10) or plurality of phased array antennas (e.g., 720 of FIG. 7).

In some embodiments, the power coefficient indicator information includes first and second power control coefficients, and base station receiver 220 receives up link signaling information and detects values of the first and second power control coefficients in the up link signaling information.

Power management controller 222 includes a circuit (e.g., logic or a processor) to determine the first adjusted transmit power to be greater than the second adjusted transmit power when the indicated first path attenuation characteristic (or first power control coefficient) is less than the indicated second path attenuation characteristic (or second power control coefficient).

Remote station 230 includes remote station receiver 234, detector 236, power measurement circuit 238 and processor 240. Receiver 234, detector 236, power measurement circuit 238 and processor 240 constitute a circuit by which remote station 230 can determine an indicated path attenuation characteristic based on a power received from the first radiation pattern and measured in circuit 238 and an initial transmit power determined in detector 236. With this circuit, remote station 230 can determine an indicated first path attenuation characteristic for a first radiation pattern of antenna system 216 and an indicated second path attenuation characteristic for a second radiation pattern of system 216 since the two radiation patterns are separately receivable. Detector 236 determines the initial transmit power, power measurement circuit 238 measures the power received from the radiation pattern as received by receiver 234, and processor 240 determines a power control coefficient to be proportional to the power received divided by the value of the initial transmit power. Power measurement circuit 238 measures an instantaneous power received, or in an alternative embodiment, measures an averaged power received, or in an alternative embodiment measures both and forms a combination of the instantaneous power received and the average power received. Remote station 230 further includes transmitter 242 to send values of the power coefficient indicator information or of the indicated first and second path attenuation characteristics to the base station.

In a variant, processor 240 forms the power coefficient indicator information as a ratio of the indicated first path attenuation characteristic divided by the indicated second path attenuation characteristic. In an alternative variant, processor 240 forms the power coefficient indicator information with a first value when the indicated first path attenuation characteristic is less than the indicated second path attenuation characteristic and to form the power coefficient indicator information with a second value when the indicated first path attenuation characteristic is greater than the indicated second path attenuation characteristic.

In an exemplary embodiment, the base station transmits a first signal at first predetermined signal power P1 from the first antenna, and a receiver in remote station 2 determines first power control coefficient PCC1 to be a power received from the first antenna at the remote station. The base station also transmits a second signal at second predetermined signal power P2 from the second antenna, and a receiver in remote station 2 determines second power control coefficient PCC2 to be a power received from the second antenna at the remote station.

Both the first and second signals are transmitted simultaneously from respective first and second antennas in ordinary operation at their respective predetermined power levels. The transmit powers are distinguishable at remote station 2 by use of different orthogonal codes OC in multipliers 12 and 14 (FIGS. 4, 5 and 11) or by use of orthogonal training sequences as may be used in a TDMA base station (FIG. 12). The receiver in remote station 2 determines the signal power received from each antenna and transmits a value representing these received signal powers to the base station in a portion of the up link signaling data as separate power control coefficients PCC1 and PCC2 or as a relative power control coefficient PCC1/PCC2.

In a preferred embodiment, the base station first transmits signals in ordinary operation from the plural antennas at selected powers that may be unequal (S102). In one variant, the base station sends the power levels selected to be transmitted from each of the plural antennas in a down link signaling channel. The remote station (1) receives the base station's selected power levels (S104), (2) determines the signal powers received from the antennas (S106), and (3) compares the power transmitted from the base station from each antenna to the powers received at the remote station to determine the relative attenuations in the down link paths (S108) as the ratio of the received power to the corresponding transmitted power. The remote station sends this ratio determined for each antenna as power control coefficients back to the base station in the up link signaling data. Then, the base station adjusts the power allowed to be transmitted from the base station from each antenna according to the determined relative attenuations for all further down link transmissions (S110).

In another variant, (1) the remote station determines power control coefficients to be the signal powers received from the antennas (S106), and (2) the remote station sends the power control coefficients back to the base station in the up link signaling data. Then, the base station (1) adjusts for closed loop time delays in its receipt of the power control coefficients from remote station 2 (S104), (2) compares the power transmitted from the base station from each antenna to the power control coefficients received at the remote station to determine the relative attenuations in the down link paths (S108), and (3) adjusts the power allowed to be transmitted from the base station from each antenna according to the determined relative attenuations for all further down link transmissions (S110).

In either variant, the power allowed to be transmitted from an antenna will be greater for antennas associated with paths determined to possess a lesser path attenuation. For example, an indicated path attenuation characteristic is advantageously determined to be the ratio of the power received at remote station 2 to the power transmitted from base station 1. In this way, little or no power is transmitted in a path that is not well received by remote station 2, while a greater power is transmitted in a path that is well received by remote station 2. In many multi-path environments, increasing power transmitted in a path that has too much attenuation does little to improve reception at remote station 2, but such increased power would contribute to co-channel interference experienced by other remote stations. To improve the overall cellular radio system, the paths with the least attenuation are permitted the greatest transmit beam powers. The base station adjusts the power transmitted from each antenna by control scaling signals SA1 and SA2 (FIGS. 4 and 5) or by controlling the overall antenna gain for each beam by adjusting the amplitude parameters in control signal C (of FIG. 6) or in signals C1 and C2 (of FIG. 9).

In an embodiment of this closed loop method of power control, the remote station determines which antenna (or beam) is associated with the least attenuation path. The remote station sends an indication of which antenna (or beam) is favored (i.e., least attenuation) back to the base station in an up link signaling path. To conserve the number of bits sent in this up link signaling path, the remote station preferably determines the favored antenna and indicates this by a single bit (i.e., a "0" means antenna 16 is favored and a "1" means antenna 18 is favored, see FIG. 4). The base station receives this single bit indicator and applies it to determine a predetermined relative power balance. For example, it has been determined that applying 80% of full power to antenna 16 (e.g., when this is the favored antenna) and 20% of full power to antenna 18 consistently provides better performance than applying 100% of full power to antenna 16 and no power to antenna 18. Thus, the base station receives the single bit relative power indicator and selects the relative power P1/P2 for antennas 16 and 18 to be 80%/20% for a "1" indicator bit and 20%/80% for a "0" indicator bit.

In slowly varying radio environments, the coefficients (or any related channel information) can be parsed into segments, and the segments (containing fewer bits than the entire coefficient) can be sent to the base station in the up link signaling data using more up link time slots. Within a segment (perhaps plural TDMA time slots), the most significant bits are preferably transferred first, and these course values are gradually updated to be more precise using consecutive bits. Conversely, in rapidly varying radio environments, a special reserved signaling symbol may indicate the use of one or more alternative compressed formats for the up link transmission of the coefficients where an average exponent of all of the coefficients is transmitted (or presumed according to the signaling symbol) in the up link, and then only the most significant bits of the coefficients are then transmitted (i.e., truncating the less significant bits). In the extreme, only one bit is transmitted in the up link direction indicating that the power control coefficient is 1 (e.g., 80% of full power transmission) when the down link channel is good, and indicating that the power control coefficient is 0 (e.g., only 20% of full power transmission) when the associated channel is not adequate.

This closed loop control over beam power management is self adapting. If power control coefficients are up linked to the base station that cause over compensation in beam power, this closed loop control system will correct for this during the next closed loop control cycle. Persons skilled in the art will appreciate that other data compression techniques may be employed in the up link signaling to adjust to rapidly varying radio environments. Similarly, persons skilled in the art will appreciate that the remote station, not the base station, may compute commands to the base station to increase, or decrease, the power in specific beams.

In an alternative variant suitable for slowly varying radio environments, the first and second beams may be sequentially transmitted at their respective predetermined power levels in a calibration mode. In such a variant, only one beam is transmitted at a time so that the remote station need not employ orthogonal codes OC or orthogonal pilot signals to determine from which beam the received signal strength (e.g., power control coefficient) has been received. Once the channel attenuation is determined, signal SIN is sent using the beamspace time coding technique.

In addition to embodiments that rely on amplifiers 102 and 104 or beam gain in phase array antennas to control closed loop power management, another embodiment relies on angular diversity management and/or beam width management with the power management being omitted. Yet another embodiment relies on both the power management and either angular diversity management, beam width management, or both.

The performance of beamspace time coding techniques depends at least in part on angular spread AS that characterizes the radio environment and how the base station adapts the beams to match the angular spread. Down link performance is generally improved when the down link beams are directed at angles of arrival at which sharp peaks occur in an angular power spectrum of a signal from a remote station. The sharp peaks suggest good transmission along the indicated path (e.g., likely direction of paths 3 and 5). However, sharp peaks may not always be found. When the angular power spectrum is diffuse and sharp peaks cannot be found, an estimate of angular spread AS is made, and the plural beams used for down link transmissions are allocated to approximately cover the angular spread. In this way the down link transmission spatially matches the total channel as determined by the angular spread.

The circuit to measure the angular power spectrum includes receiver 220 (FIG. 14) and such signal and data processing circuitry as is required to determine the angular power spectrum and peaks therein as discussed below. When a peak in the angular power spectrum is detected, an angular position is defined by the peak. Then, to direct the beam direction toward an angular position as detected, antenna controller 218 computes an array steering vector to input into antenna system 216 (FIG. 14). When an excessive number of peaks are detected in the angular power spectrum, power management controller 222 (FIG. 14) selects the angular directions to be used to form beams. Power management controller 222 may select beam directions toward specific angle of arrival paths (i.e., peaks), or power management controller 222 may select beam direction, and possibly beam widths, so as to cover a detected angular spread. The selected directions are provided to antenna controller 218 to form the beam commands to the antenna system.

In systems using frequency division duplexing, the up link and down link transmissions take place at different frequencies. There is no guarantee that peaks measured in the up link power spectrum will occur at angle that correspond to angles with good transmission performance in the down link direction. However, by employing either angle diversity management or beam width management or both, there will be a greater likelihood of producing a good down link transmission.

Figure 18:
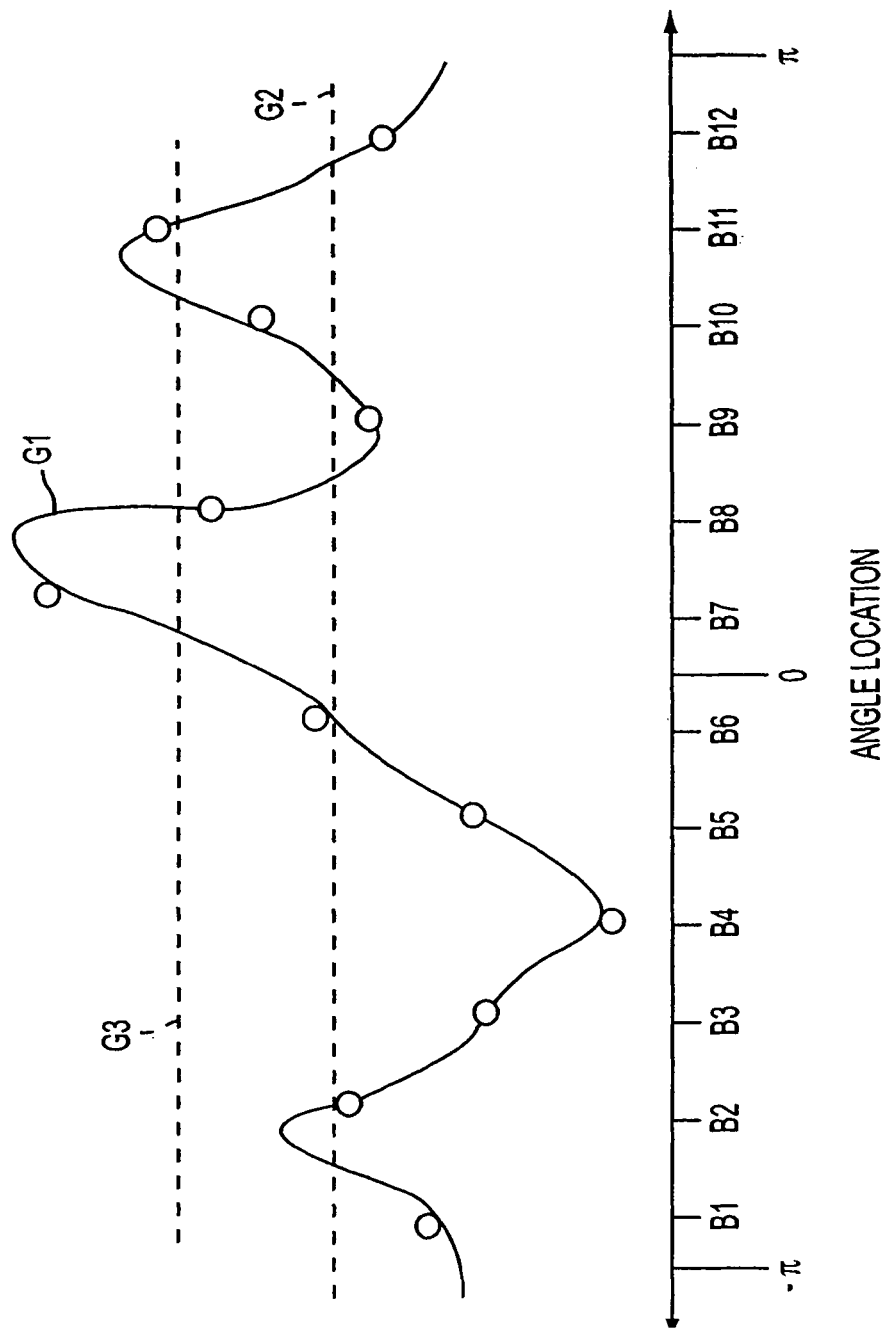
FIG. 18 is a graph of an angular power spectrum as received and/or computed by the present invention.

Both angular diversity and beam width management require a measurement of the angular power spectrum in one form or another. The remote station broadcasts an up link signal in its normal operation (e.g., signaling operation), the antenna system at the base station receives the signal, and the base station determines an angular power spectrum (i.e., a received power as a function of bearing angle in a plan view). FIG. 18 is a graph depicting the angular location of signal power received from remote station 2. In FIG. 18, discrete power measurements at each of 12 angular locations are shown based on, for example, twelve fixed location antenna beams pointed at 30 degree intervals in the antenna system for base station 1. The exemplary 12 beam antenna system may include three Butler matrix antennas, triangularly arranged, to form the 12 beam antenna system where each Butler matrix antenna forms four beams. While a 12 beam antenna system is considered in this example, it will be appreciated that any number of beams in an antenna system may be applied to the present invention (e.g., 24 beams, etc).

Alternatively, the antenna system may include three phased array antennas, triangularly arranged, to form an antenna system capable of forming the 12 beam where each phased array antenna forms a steerable beam with a beam width of 30 degrees so as to permit scanning over four beam positions. The 12 beam antenna system may also include 12 antennas of any type that have a 30 degree beam width and are angularly disposed at 30 degree increments around a 360 degree sector. While a 12 beam antenna system is considered in this example, it will be appreciated that any number of beams in an antenna system may be applied to the present invention (e.g., 24 beams, etc).

Figure 15:
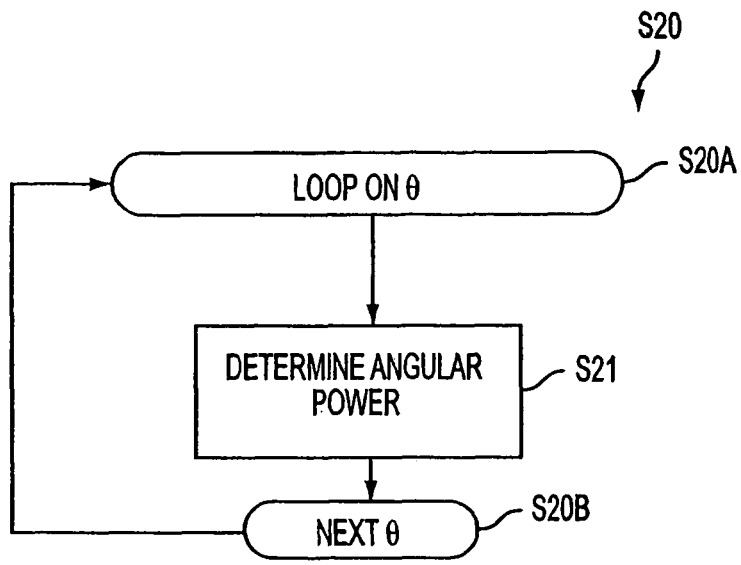
FIGS. 15-17 are flow charts of methods of determining the angular power spectrum according to the present invention.
Figure 16:
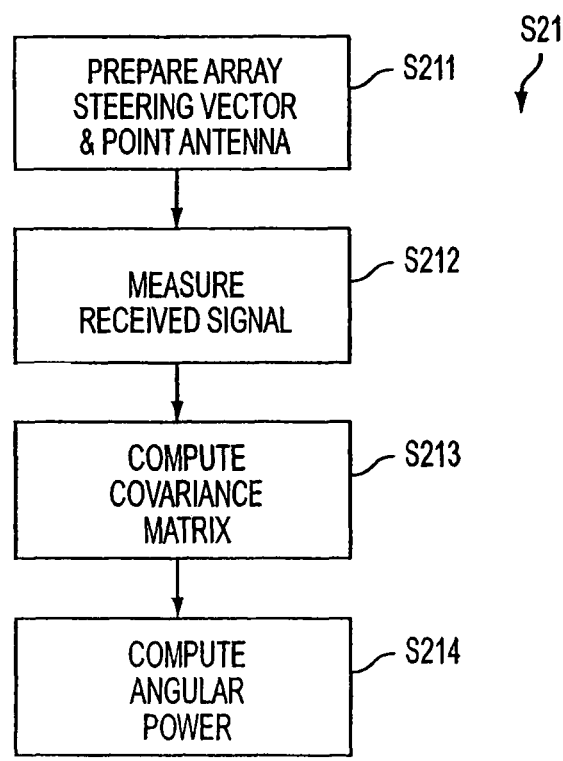

An antenna system based on a phased array antenna provides an opportunity to generate a more interpolated angular power spectrum (e.g., G1 of FIG. 18) by steering the antenna beam to point at as many angular positions as desired to generate the angular power spectrum. Power management controller 222 (FIG. 14) generates the angular power spectrum in process S20 (FIG. 15) by looping on .theta. in steps S20A and S20B and determining the angular power in step S21. Given the angle θ, power management controller causes antenna controller 218 (FIG. 14) to compute an array steering vector and point the antenna (step S211 of FIG. 16). The phased array antenna then receives a signal in receiver 220 (FIG. 14) from remote station 2 in each radiating element of the phased array antenna to form a signal vector in step S212 of FIG. 16. Each radiating element is preferably spaced apart from an adjacent element by one-half of the wavelength. For example, if a phased array antenna were to include 12 radiating elements (only 8 radiating elements are shown in antenna 720 of FIG. 7), the signal received in each of the 12 radiating elements would be sampled to form a measured signal vector. The sampled signal is preferably a complex value having amplitude and phase information. The signals from each of the 12 radiating elements are formed into a 12 element received signal vector as column vector $\hat{x}$. Next, the complex conjugate transpose of received signal vector $\hat{x}$ is formed as row vector $\hat{x}$, and the spatial covariance matrix of the received signal, $R=\hat{x}\hat{x}^H$, is calculated in step S213 (FIG. 16). When received signal vector $\hat{x}$ is 12 elements long, then the spatial covariance matrix of the received signal, $R=\hat{x}\hat{x}^H$, will be a 12 by 12 matrix.

Array steering vector $\bar{a}(\theta)$ is a column vector with one vector element for each radiating element of the phased array antenna. For example, if the phased array antenna were to include 12 radiating elements (e.g., half dipoles), array steering vector $\bar{a}(\theta)$ would include 12 vector elements. Array steering vector $\bar{a}(\theta)$ is constant C of FIG. 7, and it is used to point the beam of the phased array antenna toward bearing angle θ. Each vector element is given by:

$$\bar{a}_m(\theta) = \exp(-jxkxmxdx\sin(\theta)),$$

where k is 2π. divided by the wavelength, m is an index from 0 to M (e.g., from 0 to 11 for a 12 element antenna) defining a number associated with the radiating element of the phased array antenna, d is the separation between radiating elements of the phased array antenna (preferably one-half of the wavelength) and .theta. is the bearing angle of the antenna beam formed.

Each vector element of array steering vector $\bar{a}(\theta)$ is a corresponding vector element of constant C as depicted in FIG. 7 so that the full vector combines to define an angle of arrival θ of the received signal in the receive beam, where Bis an angle with respect to a convenient reference direction of the phased array antenna. The complex conjugate transpose of array steering vector $\bar{a}(\theta)$ is row vector $\bar{a}(\theta)^H$.

The product, $\hat{x}\hat{x}^H\bar{a}(\theta)$, is still a column vector with one vector element for each radiating element of the phased array antenna. The product, $\bar{a}(\theta)^H\hat{x}\hat{x}\bar{a}(\theta)$, is a single point, a scalar, determined at step S214 (FIG. 16) to give the value of the angular power spectrum P(θ) at the angle of arrival (θ). Thus, the angular power spectrum P(θ) is depicted in FIG. 18 at G1 and is computed to be:

$$P(\theta) = \bar{a}(\theta)^H \hat{x}\hat{x}\bar{a}(\theta)$$

where $\bar{a}(\theta)$ is an array steering vector, z is the received signal vector, $\hat{x}\hat{x}^H$ is the spatial covariance matrix of the received signal, and H denotes the complex conjugate transpose.

The above described equation for computing the array steering vector assumes the half wavelength spaced radiating elements are arrayed linearly. However, it will be appreciated by persons skilled in the art how to compute an array steering vector for radiating elements arrayed long a curved path. Three slightly "bowed out" antenna arrays may advantageously be employed in the antenna system depicted in FIG. 8. In fact, the antenna arrays may be severely "bowed out" so as to form a circle (e.g., FIG. 6). It will be appreciated by persons skilled in the art that computation of an array steering vector for such severely curved arrays of radiating elements will advantageously employ amplitude control as well as phase control in the array steering vector.

Figure 17:
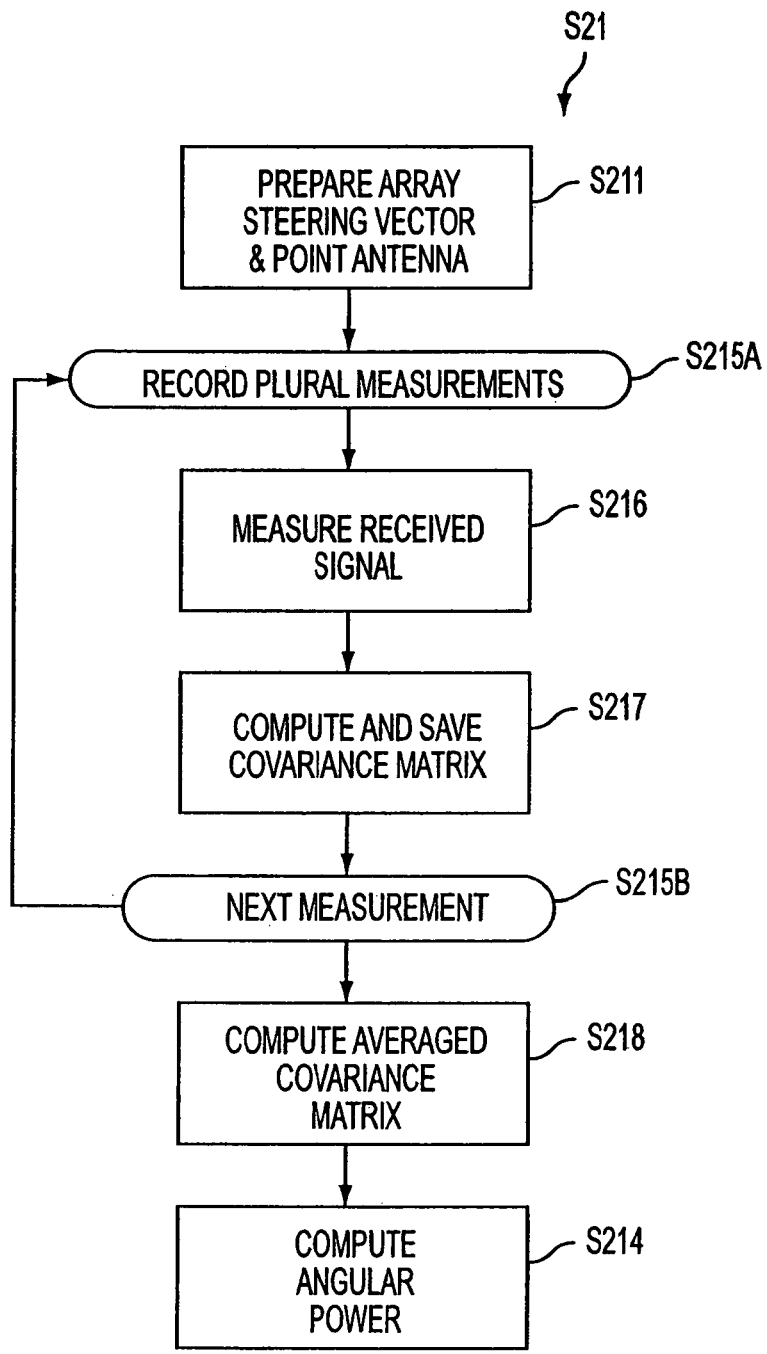

To provide improved performance the angular power spectrum is determined by averaging repeated measurements. In FIG. 17, the array steering vector is prepared and the antenna beam is pointed in step S211. The plural measurements are made by looping in steps S215A and S215B. Within this loop, received signal vector $\hat{x}$ is repeatedly measured in step S216 and the covariance matrix R is repeatedly determined and saved in step S217. Then, an average covariance matrix is determined in step S218, and angular power spectrum $P(\theta)$ is determined in step S214. This averaging determination is repeated several times over a time interval for each predetermined direction ($\theta$). In this way, fast fading phenomena are averaged out. The time period must be short enough that a mobile remote station 2 will not change position sufficiently to change the beam in which it is located during the averaging period. This time period, is preferably larger than the channel coherence time to average out fast fading effects. While the channel coherence time is not rigorously and universally defined, it may be taken to be proportional to and approximately equal to an inverse of the Doppler spread.

The Doppler spread is more rigorously defined. Due to a relative velocity between the base station and a mobile remote station, there will be a physical shift in the received frequency with respect to the transmitted frequency. The Doppler spread is twice this frequency shift. For example, the Doppler frequency shift is the ratio of the relative velocity to the wavelength (in like units, meters/second divided by meters or feet/second divided by feet, etc.). If a mobile remote station is traveling 13.9 meters/second (about 50 km/h) and the wavelength is about 0.15 meters (e.g., 2,000 MHz signal with the speed of light equal to 300,000,000 meters per second), then the Doppler frequency shift is 92.7 Hz, the Doppler spread is 185 Hz, and the channel coherence time is about 5.4 milliseconds. It can be easily verified that at a relative velocity of 40 meters per second (about 144 km/h) the channel coherence time is about 1.9 milliseconds, and that at a relative velocity of 1 meter per second (about 3.6 km/h) the channel coherence time is about 75 milliseconds.

The averaging time interval is preferably set to be greater than an inverse of the Doppler spread and less than a time in which a mobile station moving at an expected angular speed moves one-half of a beam width of the base station antenna system. The base station knows the remote station's range or can infer the range from signal strength. The base station is designed to communicate with mobile stations that can move at speeds up to a predetermined speed. This speed divided by the range may be taken to be the angular speed if the mobile station is moving radially around the base station. Setting the averaging interval to be a half beam width divided by the angular speed provides an estimate of the time in which a mobile remote station 2 will not change position sufficiently to change the beam in which it is located during the averaging period.

The time period over which the power $P(\theta)$ is averaged is usually much greater than the channel coherence time. For example, in a wide band CDMA system operating in an environment with a high incidence of multi-path reflections (e.g., urban environment), the average period could be tens of time slots. For indoor environments with a high incidence of multi-path reflections, the mobile is much slower and the averaging period can be much longer.

The base station computes the angular power spectrum and determines whether or not sharp peaks are indicated in the power spectrum. When sharp peaks are indicated, the angle location of each peak is determined. When the power spectrum is diffuse and no sharp peaks are indicated, the base station determines angular spread AS by first determining the angles at which the received angular power spectrum exceeds a predetermined threshold (G2 in FIG. 18). The threshold may also be adaptable based on the radio environment (e.g., signal density) detected by base station 1.

Sharp peaks in the angular power spectrum may be detected by, for example, using a two threshold test. For example, determine a first continuous angular extent (in degrees or radians) at which the power spectrum exceeds a first threshold G3. Then, determine a second continuous angular extent at which the power spectrum exceeds a second threshold G2 (lower than first threshold G3). When the ratio of the first angular extent divided by the second angular extent is less than a predetermined value, peaks are indicated.

When peaks are indicated, angle diversity management (i.e., the management of the direction of arrival of the beams) is invoked, and possibly beam width management is invoked. The sharpness of the spectral peaks may be determined by comparing the angular power spectrum against two thresholds. For example, in FIG. 18, three peaks exceed the threshold G2, but only two peaks exceed the threshold G3. The angular spread of a single peak determined according to threshold G2 is broader than the angular spread determined according to threshold G3. The ratio of the angular spread of the single peak determined by G3 as compared to the spread determined by G2 is a measure of the sharpness of the peak. Alternatively, the threshold against which the angular power spectrum is measured may be moved adaptively until there are at most two peaks in the angular power spectrum above the threshold to reveal the directions of paths 3 and 5. For example, when two sharp peaks occur in the angular power spectrum and the base station transmits two beams, the base station defines the direction of these peaks (i.e., the two distinct angular directions where the power spectrum exceeds threshold G3) to be the angular directions for paths 3 and 5 (FIG. 1). This is referred to as angle of arrival diversity. The base station points steerable beams, or selects fixed beams to point, along respective paths 3 and 5. Persons skilled in the art will appreciate how to extend angular diversity management to more than two beams.

On some occasions, the angular power spectrum includes three or more angular positions that correspond to respective peaks in the angular power spectrum. When the base station has two beams, the base station selects first and second angular positions from the three or more angular positions either (1) based on the avoidance of angles at which co-channel users are located so as to minimize co-channel interference on a system wide basis, or (2) so as to balance power distribution in amplifiers of the transmit station.

The beam widths in a phased array antenna are generally selectable by controlling an amplitude of elements in the beam steering vector (e.g., vector C of FIG. 7). When the antenna system includes a phased array antenna with controllable beam widths and the spectral peaks are sharp, the base station sets or selects beams to be as narrow as practical given the antenna system in order to concentrate the transmit power in directions along respective paths 3 and 5. Paths 3 and 5 are expected to have good transmission properties since the spectral power peaks are sharp.

On the other hand, when the angular power spectrum is so diffuse that peaks are weak or not indicated, a general angular window is determined based on the angular extent over which the power spectrum exceeds a threshold (e.g., G2 of FIG. 18) or at least the continuous angular extent needed to cover the peaks where the angular power spectrum exceeds the threshold. In such a case, preferred embodiments of the invention select beams such that the sum of the beam widths for all beams used for down link transmissions approximately equals angular spread AS.

When the antenna system includes a phased array antenna with controllable beam widths but the spectral peaks are not so sharp, the base station first determines the angular spread to be the angular extent of the power spectrum that is greater than a threshold or at least the continuous angular extent needed to cover the peaks where the angular power spectrum exceeds the threshold. Then, the base station sets or selects the beam widths for the beams to approximately cover the angular spread. This is referred to as angular power diversity or beam width management. For example, a two beam base station that seeks to cover the angular spread will select a beam width for both beams to be about half of the angular extent, and the base station points the two beams to substantially cover the angular spread.

Extensions to more beams are straightforward as will be appreciated by persons skilled in the art. For example, when the base station has capability for beamspace time encoding in a four beam base station, a beam width is selected for each beam that is approximately one-fourth of the angular spread. In this way the down link transmission will spatially match the channel. It is advantageous to match the coverage of orthogonal beams to the angular spread of the channel to obtain maximum angular diversity gain. However, usually two to four beams are adequate.

When the base station has an antenna system with plural fixed beams (as with a hex corner reflector antenna) and when the angular power spectrum is diffuse and angular spread AS exceeds the beam width of a single beam, a desirable variant of the invention combines two adjacent beams into a single broader beam (e.g., combine two 60 degree beams into a single 120 degree beam) to better match the radio channel. In such a case, the two adjacent beams are used as a single broader beam employing the same pilot code or orthogonalizing code. In fixed beam base stations, it is advantageous that the number of beams M that can be generated is large (e.g., M>4, and preferably at least 8) so that high beam resolution can be achieved. When a broader beam is needed to better match the channel, two adjacent beams may be combined.

The present invention fits well in a base station where the antenna system employs digital beam forming techniques in a phase array antenna (e.g., antenna 720 of FIG. 7 and antenna 40 of FIG. 10). With digital beam forming techniques, the apparent number elements in an antenna array (i.e., the apparent aperture dimension) can be electronically adjusted by using zero weighting in some of the elements according to the available angular spread. In this fashion, the beam width can be easily adapted by the base station to match the angular spread. This beam width control operates as an open loop control system.

In an alternative embodiment, beam hopping techniques are employed when the angular power spectrum exceeds the threshold in one large angular extent. A beam hopping technique is a technique that covers the angular spread sequentially. For example, when the transmit beams in any one time slot do not cover the angular spread, the angular spread may be covered during subsequent time slots. Consider an exemplary system that has a two beam base station capable of forming 30 degree beams where the angular spread covers 120 degrees (i.e., the width of four beams). In a beam hopping system, the base station forms two 30 degree beams for transmission during a first time slot so as to cover a first 60 degree sector of the 120 degree angular spread, and forms two other 30 degree beams for transmission during a second time slot so as to cover the remaining 60 degree sector of the 120 degree angular spread.

Beam hopping greatly improves performance in radio environments with large angular spreads. It is known that the down link performance degrades in frequency division duplex cellular radio systems when the angular spread becomes large, due at least in part to the increased angular uncertainty in the optimal selection of directions for transmission. In frequency division duplex systems, the up link directions determined to have good power transmission capacity (low attenuation) could be in a deep fade for a down link transmission due to the different carrier frequencies.

With a large angular spread in the radio environment, the number of possible directions for down link transmission will be large. Instead of selecting the two best directions, spatial diversity is achieved by sequentially forming down link beams to cover all of the potentially good directions where the angular power spectrum exceeds a threshold. This is particularly important in micro-cells or pico-cells where the angular spread can cover the whole sector or the whole cell.

In a scenario where remote station 2 is fixed or of low mobility, beam hopping has additional advantages over selection of the two strongest directions. When the best two directions are selected as the beam transmit directions for a large number of consecutive bursts, there is considerable penalty (in terms of loss of data) if the selected directions are a wrong choice (e.g., down link in deep fade even though up link is good). However, by hopping the beams over a group of potential directions, the loss of data from any one direction that turns out to be in deep fade will be for only a limited duration (e.g., only one time slot). This angular diversity tends to "whiten" the errors generated by selection of bad transmission directions.

Furthermore, the co-channel interference to other remote stations generated during beam hopping transmissions will tend to be whitened by the spatial spreading of the transmitted signal. Co-channel interference can be particularly troublesome when high data bit rate connections are required since high bit rate connections are achieved with high beam powers. The large amount of beam power involved in the high bit rate connection generates highly colored interference (not uniformly distributed) when a non-hopping scheme is employed by the base station for beam selection.

Figure 19:
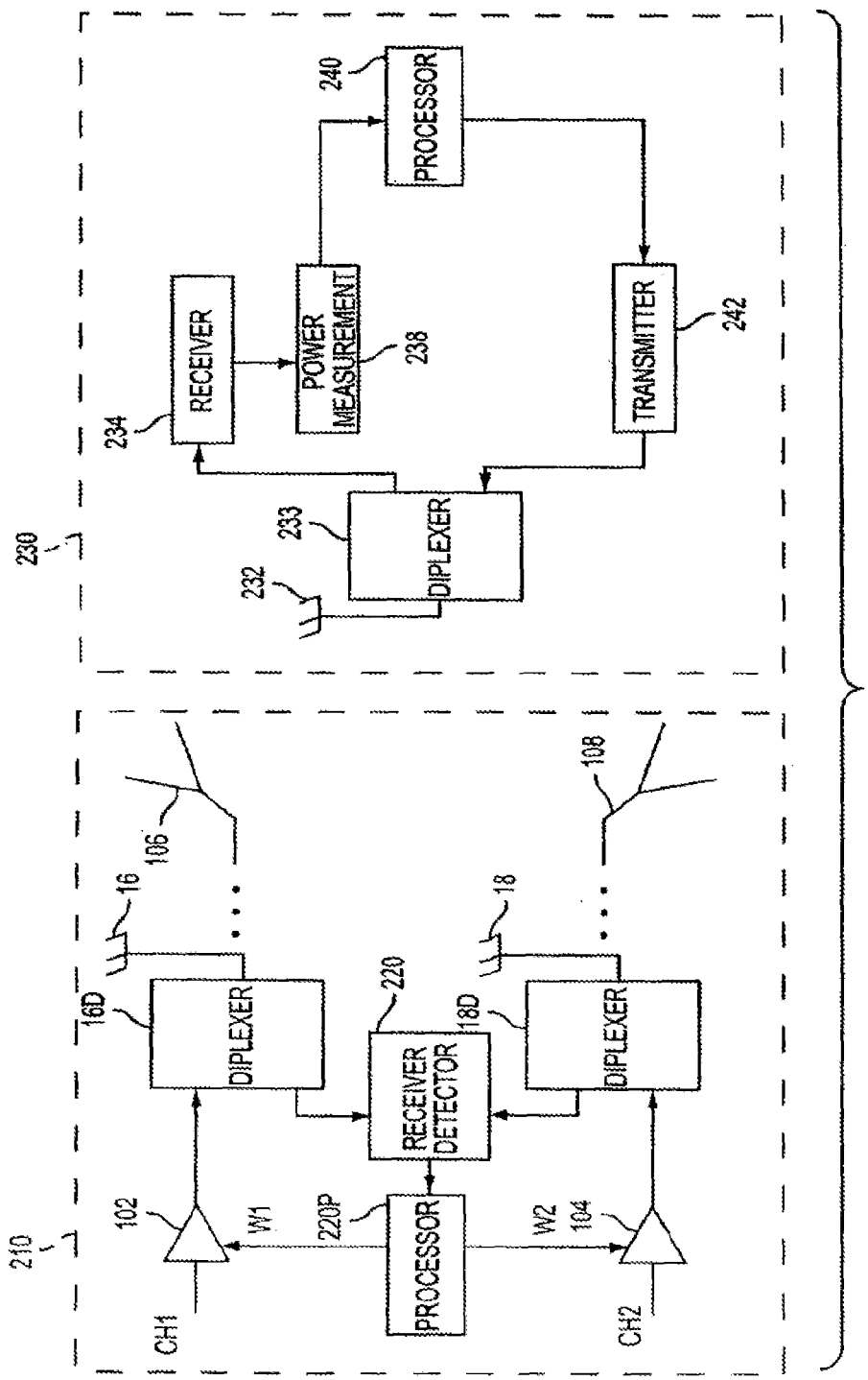
FIG. 19 is a block diagram of an embodiment of the present invention.

In FIG. 19, another embodiment of the invention includes base station 210 and remote station 230 as described with reference to FIG. 14. In the present embodiment, base station 210 includes weighting amplifiers 102 and 104 to apply respective weights W1 and W2 to respective feed signals CH1 and CH2. In the present embodiment, weights W1 and W2 are complex numbers or at least phase and amplitude pairs to control both the amplitude and phase of the signal transmitted from antennas 16 and 18. The weighted signals may alternatively be transmitted from directional antennas 106 and 108. FIG. 19 depicts diplexers 16D and 18D coupled between the weighting amplifiers and the respective antennas to duplex the antennas so they may be used in an up link receive mode as well as a down link transmit mode; however, a separate base station antenna may be used to receive up link signals.

In a preferred variant, one antenna is used as a reference with its corresponding weight set to 1+j0 (or amplitude=1, phase=0°). The other weight is determined relative to the reference weight. In general, base station 210 may employ two or more channels, each with an antenna, diplexer, weighting amplifier and all associated encoders. If M is the number of transmitting antennas, then the number of weights that must be determined is M−1 since only differential information (i.e., weights) need to be determined. Without loss of generality, the following description focuses on two transmitting antennas (M=2) so that only one complex number weight need be determined.

In FIG. 19, remote station 230 includes remote station antenna 232, remote station receiver 234 coupled to remote station antenna 232 through diplexer 233, signal measurement circuit 238, and processor 240. Receiver 234 constitutes a circuit by which remote station 230 receives first and second signals from respective first and second transmit antennas. Signal measurement circuit 238 and processor 240 and control modules described herein constitute a circuit by which remote station 230 determines channel state information based on the received first and second signals and segments the channel state information into a plurality of channel state information segments. Signal measurement circuit 238 measures the signal strength (and phase) received from each of the plural orthogonal antennas, and processor 240 determines channel state information. Signal measurement circuit 238 measures an instantaneous signal strength (and phase) received, or in an alternative variant, measures an averaged signal strength received and a phase at a reference time.

The processor determines the channel state information from information provided by signal measurement circuit 238. The processor selects a reference signal from among the signals received from the different antennas. For each of the plural antennas, the processor divides the received signal strength (and phase) determined by signal measurement circuit 238 by the selected reference signal strength (and phase). This ratio is determined as a ratio of complex numbers (or phase/amplitude pairs). The ratio for the reference antenna is, by definition, 1+j0. In the case of two antennas, there is only one ratio to be sent, the ratio of the reference antenna being a constant reference.

Processor 240 determines the channel state information from the normalized ratio or ratios. Each ratio includes both amplitude and angle information. It is the object of this process to adjust the phase of the signal transmitted from the two antennas (or more) so that they will constructively reinforce at remote station 230. To ensure constructive reinforcement, it is desired to phase delay or advance a signal transmitted from each antenna relative to the reference antenna. For example, if first antenna 16 is the reference antenna, then the angle portion of the ratio for the signal received from second antenna 18 is further examined. If this angle is advanced 45 degrees relative to the reference antenna, it will be necessary to introduce a 45 degree delay at the transmitter for second antenna 18 to achieve constructive reinforcement at remote station 230. Thus, processor 240 determines the amount of phase delay or advance needed to achieve constructive reinforcement at remote station 230 by adding the desired additional delay to the phase of the initial transmitted signal, and if the addition result is greater than 360, then subtracting 360. This phase angle then becomes the phase angle transmitted as part of the channel state information.

Processor 240 also determines the amplitude part of the channel state information. The object here is to emphasize the antenna with the best path (i.e., lowest attenuation path) from the antenna to remote station 230. The total power transmitted from all antennas may be regarded here as constant. The question to be resolved by the amplitude part of the channel state information is how to divide up the total transmitted power.

To do this, processor 240 measures the channel gain (the inverse of the attenuation) by computing, for each antenna, the ratio of the power received divided by the power received in the reference signal. The power received is the square of the signal strength measured by signal measurement circuit 238 (i.e., $P_i=(a_i)^2$ where $a_i$ is the signal strength from antenna 1). The signal transmitted through each different antenna or antenna beam includes its unique and mutually orthogonal pilot code modulated on a signal transmitted at signal power $P_{TX}$. The remote station measures the complex channel impulse response, $H_i=a_i \exp(\omega_i)$ as a ratio of the signal received divided by the reference signal received where $\omega_i$ is the relative phase of the signal being measured and $a_i$ is the relative signal strength. Then $P_i$ is determined as the square of $a_i$. The relative channel response for each antenna is measured in terms of received power. If only one bit were reserved in the up link signaling channel for amplitude feedback information, the bit would preferably command 80% of the total power to be transmitted by the antenna with the lowest attenuation path to remote station 230 and command 20% of the total power to be transmitted by the antenna with the highest attenuation path.

If two bits were reserved in the up link signaling channel for amplitude feedback information, the bits could define four amplitude states. For example, processor 240 would compute a ratio between the path attenuation from antenna 16 and the path attenuation from antenna 18 and then slice the ratio according a predetermined range of values that this ratio can take. The slicing process defines four sub-ranges and identifies into which of the four ranges the computed ratio fits. Each sub-range would define the desired split of the total power transmitted by two antennas 16 and antenna 18 to be, for example, 85%/15%, 60%/40%, 40%/60% and 15%/85%, respectively. The two bits would thus encode one of these splits as the desired split in the total power transmitted by two antennas.

Persons skilled in the art will appreciate, in light of these teachings, that the amplitude portion of the channel state information may be computed by various means. Described here is a table look up means, but other means to compute the split of the total power to be transmitted are equivalent. It will be appreciated that three or more bits may be used to define the power split.

Processor 240 also segments the channel state information (including the amplitude portion and phase angle portion described above) into a plurality of channel state information segments based on the design. Remote station 230 further includes transmitter 242 to send the plurality of channel state information segments to base station 210.

The channel state information to be transmitted is a complex coefficient in the form of phase and amplitude information, and it is to be transmitted from remote station 230 to base station 210 in a number of segments (N segments) carried in corresponding slots in an up link signaling channel. A partition of the N slots into N1 and N2 (where N=N1+N2) is done in such a way that the first N1 slots carry phase information and the remaining N2 slots carry amplitude information. In principle N1 and N2 can be arbitrarily chosen, but a common value for these parameters could be N1=N2=N/2. Assume that each slot reserves K bits for carrying the corresponding information segment. The phase can be resolved to an accuracy of:

$$\varphi_{min} = \frac{360}{2^{N_1 K}},$$

and the amplitude can be resolved to an accuracy of, $$A_{min} = \frac{A_{max}}{2^{N_2 K}}$$

where $A_{max}$ amplitude.

For example, assume that the number of slots, N, is 6, and three slots are reserved for each of N1 and N2. Assume that the number of bits per slot, K, is 1, and assume that the maximum amplitude, $A_{max}$, is 3 volts. Then, the accuracy of the phase and amplitude are $\phi_{min}$=45°, and the amplitude $A_{min}$ is 0.375 volts. However, if the number of bits per slot, K, were increased to 2, the accuracy of the phase and amplitude that could be sent would be $\phi_{min}$=5.6°, and the amplitude $A_{min}$ is 0.05 volts.

In general, a quantized or truncated version of the exact channel state information is formed so that the bits in the truncated version exactly matches the number of bits available in the up link signaling channel. The truncated version is segmented into phase segments $\phi_i$ (i=1 to N1), and the segments are transmitted in a hierarchal order so that the most significant bit (MSB) is transmitted in the first segment and the least significant bit (LSB) is transmitted in the last segment. Similarly, each amplitude segment, $A_i$ (i=1 to N2) contains a quantized or truncated segment of the exact channel state information (the ratio) and it is transmitted in a hierarchal order.

The present embodiment of the invention improves the down link performance of mobile communications due to improved phase angle and amplitude accuracy for use in forming down link beams. This embodiment is particularly suitable for low mobility environments, and it suits high data rate applications in indoor and pedestrian environments. The embodiment is particularly suited for high bit-rate wireless data applications for laptop computers.

For example, assume the remote station is moving at a speed of v=1 meter per second (3.6 kilometer per hour) and the carrier frequency is 2 gigahertz (λ=0.15 meters). The maximum Doppler frequency $f_D$ is v/λ and the channel coherence time $T_C$ is computed to be:

$T_C$=1/(2$f_D$)=λ/(2v)=75 milliseconds.

It can be assumed that the channel state information will remain stable (nearly constant) over a time period equal to $T_C$/10, and therefore, the channel state information may be sent from remote station 230 to base station 210 in during this stable time period of 7.5 milliseconds. Since wideband CDMA (WCDMA) standards define slot durations to be 0.625 milliseconds, one can use 12 slots to send the channel state information back to the base station.

There are several ways to pack the channel state information in the up link slots. Table 1 illustrates an example based on only one bit per slot (K=1). In Table 1 three-bit accuracy is used for both the phase angle and the amplitude information. The phase angle is transmitted in the first 6 slots, and the amplitude information is transmitted in the last 6 slots. In both cases, the most significant bits are transmitted first. In slot 1, the most significant bit of the three-bit phase angle is transmitted. In slot 2, the same bit is repeated to improve reliability. After that, the remaining phase angle bits are transmitted, and the amplitude information bits are sent in the same fashion. The first bit gives the phase angle to an accuracy of 180°. as if in a one-bit. After slot 3, the phase angle is sent to an accuracy of 90°. as if in a two-bit, and after slot 5, the phase angle is sent to an accuracy of 45°. as in the three-bit. If it is assumed that the phase angle changes about 360°. during the coherence time of the channel, then in the above example, the phase angle will change about 36° in the 7.5 millisecond time period it takes to send 12 slots. This corresponds well to the phase accuracy achievable with three-bit data (45°.

After slot 7, the amplitude information is sent to an accuracy of 0.5 of the maximum amplitude as if in a one-bit. After slot 9, the amplitude information is sent to an accuracy of 0.25 of the maximum amplitude as if in a two-bit, and after slot 11, the amplitude information is sent to an accuracy of 0.125 of the maximum amplitude as in a three-bit.

TABLE 1

| Format for Sending Channel State Information To The Base Station | |
|---|---|
| Slot Number | Feedback Bit |
| 1 | Phase MSB |
| 2 | Phase MSB |
| 3 | Phase Bit 2 |
| 4 | Phase Bit 2 |
| 5 | Phase LSB |
| 6 | Phase LSB |
| 7 | Amplitude MSB |
| 8 | Amplitude MSB |
| 9 | Amplitude Bit 2 |
| 10 | Amplitude Bit 2 |
| 11 | Amplitude LSB |
| 12 | Amplitude LSB |

In general the phase information is more important than the amplitude information. The optimum maximal ratio combining performs only about 1 dB better than the equal gain combining that would be used if there were no amplitude information feedback, and thus, a larger allocation to phase bits (N1) and a lesser allocation to amplitude bits (N2) has advantages. For example, one could allocate three phase bits and two amplitude bits so that the feed back channel state information could be sent in a WCDMA format without redundancy in 3.125 milliseconds.

The tradeoff between the allowed feedback capacity (e.g., one or more bits/slot), the feedback reliability (e.g., number of repeated or redundant bits) and the feedback accuracy (e.g., number of phase angle and amplitude bits) is application and environment specific. For example, a three-bit check code in a well known SECDED (single error correct, double error detect) format may be appended to 8 bits of information to provide redundancy error checking Persons of ordinary skill in the art, in light of these teaching, will appreciate how to match the feedback capacity, the feedback reliability and the feedback accuracy to the application and environment.

Processor 240 (FIG. 19) segments the channel state information into a plurality of channel state information segments according to the format defined by the system modes. In fact, a system may be designed with multiple modes, each mode defining different formats. For example, one mode may send only phase angle correction information commanding equal amplitudes to each of the antennas, and another mode may send three bits of phase angle information and one bit of amplitude information. Then transmitter 242 encodes the plurality of channel state information segments in an up link signaling channel and sends the encoded information through diplexer 233 and antenna 232 to base station 210.

In one variant of the embodiment, there are several modes requiring from 1 to, for example, 20 bits to express the channel state information in the up link signaling channel. In this variant, processor 240 determines the rate at which the channel state information changes based on changes from update to update. When the rate is slow, indicating a slow moving or stationary remote station, the feedback mode is adaptively changed to a mode that permits more data bits of the channel state information to be sent to the base station. However, when the channel state information changes rapidly, indicating that the remote station is rapidly moving, then the feedback mode is adaptively changed to a mode that sends fewer bits for each channel state information update.

Base station 210 receives the information encoded in the up link signaling channel and decodes the plurality of channel state information segments in receiver/detector 220. Processor 220P then reconstructs the channel state information from the received plurality of channel state information segments and produces weights W1 and W2. Weights W1 and W2 are provided to respective amplifiers 102 and 104 to weight first and second feed signals CH1 and CH2 to feed to the respective first and second antennas 16 and 18 based on the reconstructed channel state information.

Two variants of this embodiment may be implemented in processor 220P. First, the processor may collect all segments to reconstruct the total channel state information before forming weights W1 and W2 to apply to amplifiers 102 and 104. Alternatively, the channel state information is sent to the base station phase angle first and within the phase angle segments, most significant bit first. The values of W1 and W2 may be updated within the processor as each bit is received to provide more immediate feedback to amplifiers 102 and 104. This produces, in effect, a higher feedback bandwidth.

Figure 20:
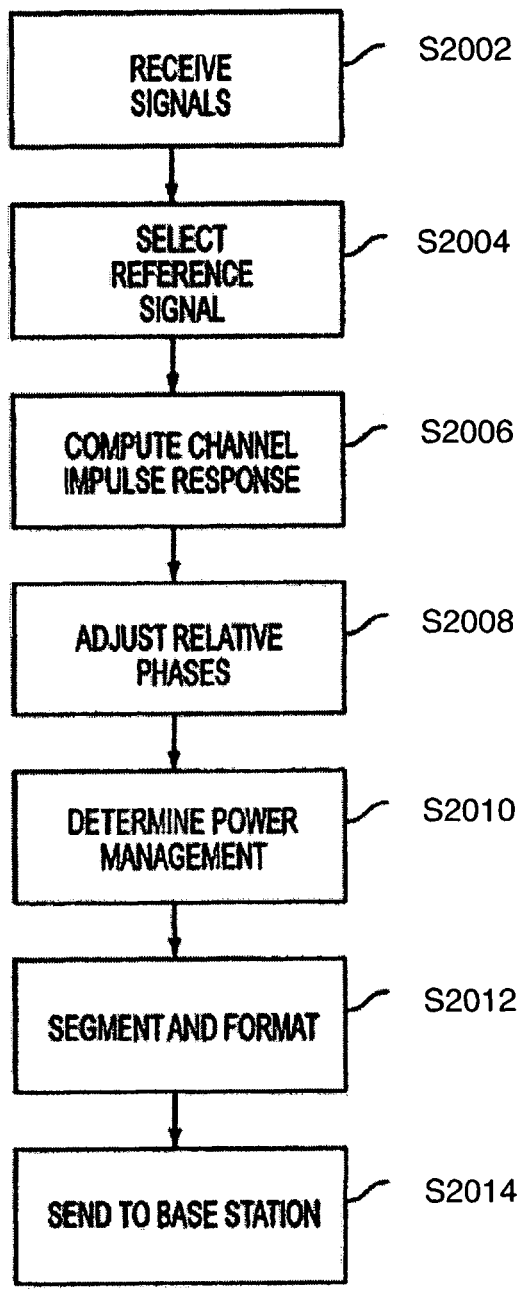
FIG. 20 is a flow chart of a method of feedback control according to the present invention.

In FIG. 20, a method practiced on processor 240 includes several steps that are typically implemented in the processor with software modules and/or logic. However, persons skilled in the art will appreciate that the steps may be implemented in the processor using ASIC or other custom circuitry.

In step S2002, for each of the plural antennas, the processor receives the received signal strength and phase (a complex number) as determined by signal measurement circuit 238. In step S2004, the processor selects one of the received signals to be a reference signal. This selection may be arbitrary or it may be to select the signal with the greatest phase lag (least likely to need to or want to be slowed down). In step S2006, the processor divides the received signal strength and phase (a complex number) determined by signal measurement circuit 238 by the received reference signal strength and phase (a complex number). The ratio for the reference antenna is, by definition, 1+j0. In the case of two antennas, there is only one ratio to be determined and sent, the ratio of the reference antenna being a constant reference.

In step S2008 (FIG. 20), processor 240 determines the amount of phase delay or advance needed at each transmitting antenna to achieve constructive reinforcement at remote station 230. If the reference signal is chosen to be the signal with the most lag, the remaining signals may achieve phase alignment with the reference signal by adding a delay at the antenna. Step S2008 determines the required additional delay, but if the additional phase delay added to the phase of the non-reference signal results in a phase that is greater than 360 degrees, then subtract 360. This phase angle then becomes the phase angle transmitted as part of the channel state information. Persons skilled in the art in light of these teachings will appreciate that step S2008 may be performed in the base station so that only the phase angle of the channel impulse response need be sent in the up link signaling channel.

In step S2010, power management information to define the transmit distribution (the allocation of the total power among the transmit antennas) is determined. Persons skilled in the art will appreciate in light of these teachings, that the amplitude portion of the channel state information may be computed by various means. Described here is a table look up means, but other means to compute the split of the total power to be transmitted are equivalent.

For example, the relative amplitude and relative phase of the signal from each antenna may be transmitted in the up link signaling channel for the base station to further process. Alternatively, the remote station may determine in step S2010 an indicia of the desired power distribution. If only one bit were reserved in the up link signaling channel for amplitude feedback information, the bit would preferably command 80% of the total power to be transmitted by the antenna with the lowest attenuation path to remote station 230 and command 20% of the total power to be transmitted by the antenna with the highest attenuation path. If two bits were reserved in the up link signaling channel for amplitude feedback information, the bits could define four amplitude sub-ranges. For example, 85%/15%, 60%/40%, 40%/60% and 15%/85%, respectively. The two bits would thus encode one of these sub-ranges as the desired split in the total power transmitted by two antennas. Extensions to more antennas or to the use of more bits to represent the amplitude portion of the channel state information will be apparent to persons of ordinary skill in the art. The exact nature of the table look up or other means depends on the number of bits reserved in the up link format to carry the amplitude portion of the channel state information.

In step S2012, the channel state information is segmented and packed into the formats described herein (e.g., Table 1). In step S2014, the segments are sequentially transmitted in the up link signaling channel to the base station. From there, the respective weights for the antennas are recovered and applied to amplifiers 102 and 104 (FIG. 19).

In Frequency Division Duplexed systems where up link and down link communications are carried out over different frequencies, it is not possible to exactly determine the down link channel state from up link information since the two directions are based on different frequencies. The present system has the advantage of measuring the down link channel state from down link data and then sending commands in the up link signaling channel to adjust the amplitude and phase of the transmitted down link signals.

Figure 21:
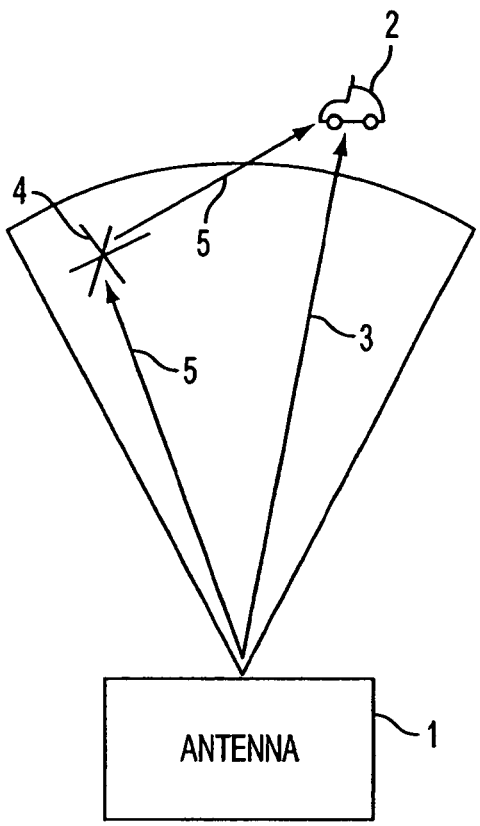
FIG. 21 is a schematic view that illustrates the multi-path signal processed by the invention with a sector coverage antenna.
Figure 22:
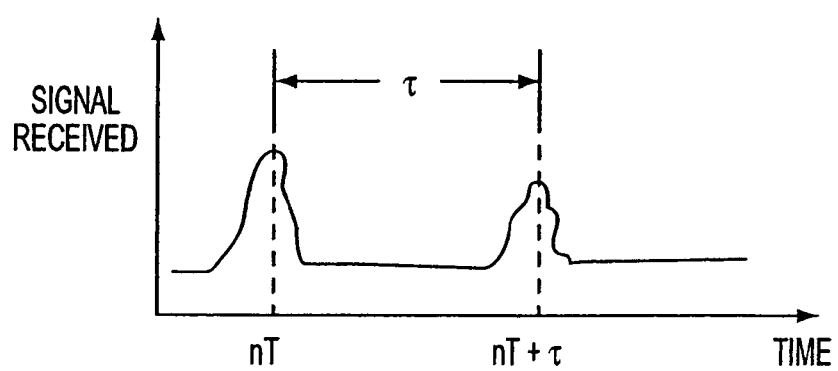
FIG. 22 is a graph showing the direct and multi-path signal of FIG. 21 that is received by a remote station.

In FIG. 21, antenna 1 of the base station is a sector coverage type of antenna. Antenna 1 sends a signal to remote station 2 over direct path 3; however, another multi-path signal reflects off of radio wave scatter 4 and travels over multi-path 5. As a result, remote station 2 receives two replicas of the signal at slightly different times. In FIG. 22, the two replicas are depicted as signals received at time nT and time nT+τ where τ is the additional time delay that occurs due to the additional length of multi-path 5 when compared to direct path 3. The multi-path delay may be such as to cause destructive interferences between the two signals received over the two paths. Additional radio wave scatterers may create even more multi-path signals.

A conventional Rake receiver correlates a local signal (e.g., the spreading code of a CDMA signal) and the received signal that includes signal replicas received with different delays. With correct delays, the signals are coherently combined to reinforce energies. When the local signal (e.g., desired spreading code) is correlated with a signal from a desired signal path, the local signal is also correlated with every one of the other signal replicas (e.g., signal replicas from signal paths with different delays). The terms corresponding to the correlation with the other signal replicas are unwanted terms, and they tend to degrade the performance of the system. The unwanted correlation terms also cause a loss of orthogonality between different users with different codes, and as a result, co-channel users start to interfere with each other. The degradation effect becomes more pronounced with short spreading codes that are typically used in high bit rate links.

The present invention operates the Rake receiver in an unconventional fashion. Using beam forming, the present invention separates different signal paths and applies pre-transmission time shift compensation on each signal replica (e.g., each beam) so that all signal replicas arrive at the receiver simultaneously. In this manner, the receiver appears to receive a signal processed only through a 1-tap channel even though it actually receives and coherently combines multiple signals over multiple paths (e.g., paths 3 and 5 in FIG. 1). This avoids a loss of orthogonality and minimizes or eliminates cross correlation terms that might otherwise degrade system performance.

In an embodiment of the present invention, the desired data is included in two or more space-time coded signals. The signals are identified by unique and mutually orthogonal signature codes. If one of the space-time coded signals is significantly delayed with respect to another, the orthogonality of the signature codes may be reduced. It is preferred to delay the shortest path signal so as to arrive at remote station 2 at the same time that the longer path signal arrives at remote station 2.

Figure 23:
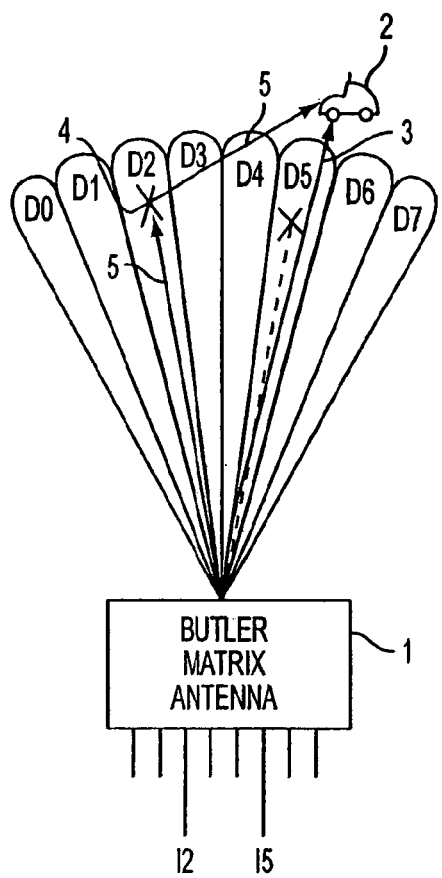
FIG. 23 is a schematic view that illustrates the multi-path signal processed by the invention with a multi-beam antenna covering a sector.

In FIG. 23, an exemplary system includes antenna 1 and remote station 2. Exemplary antenna 1 may be a Butler matrix multi-beam antenna array or any other multi-beam antenna array. The desired data in this example are encoded into two space-time coded signals I2 and I5. Space-time coded signals I2 and I5 are transmitted in beams D2 and D5, respectively. Beam D5 sends signal I5 to remote station 2 over direct path 3. Beam D2 sends signal I2 to remote station 2 over indirect multi-path 5.

Figure 2:
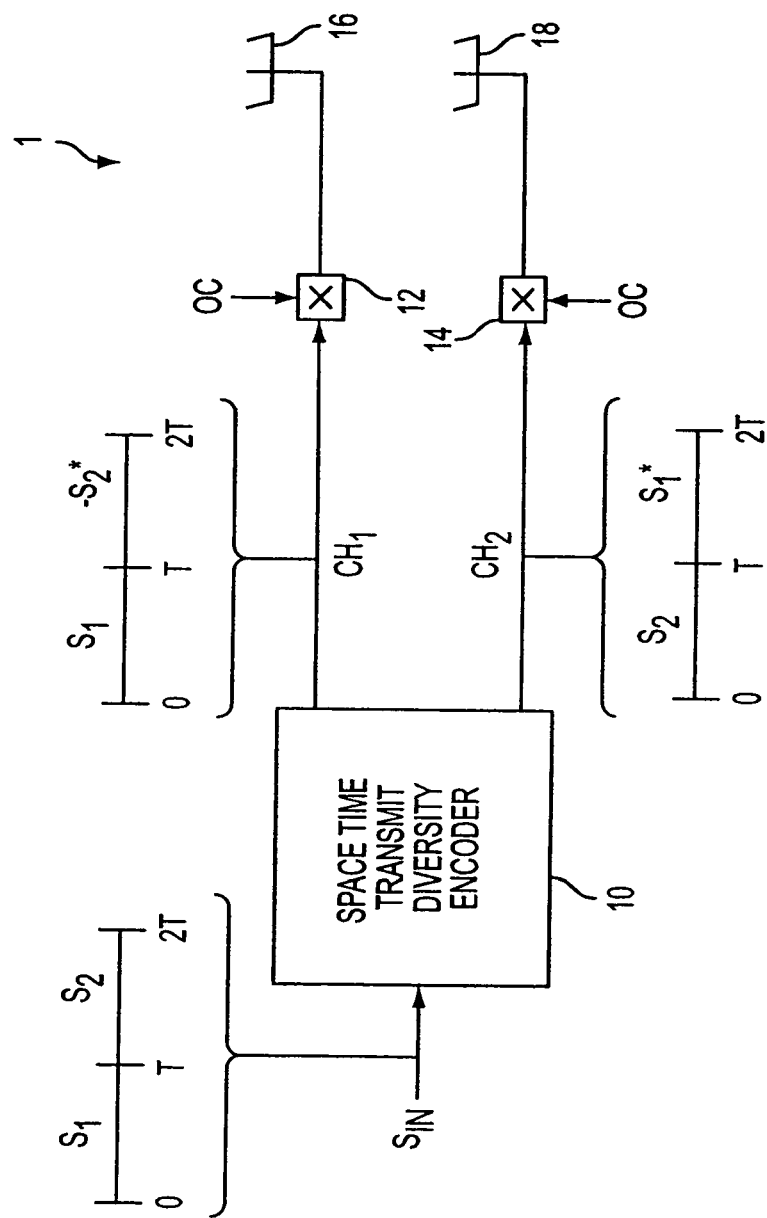
FIG. 2 is a block diagram of a known base station.
Figure 3:
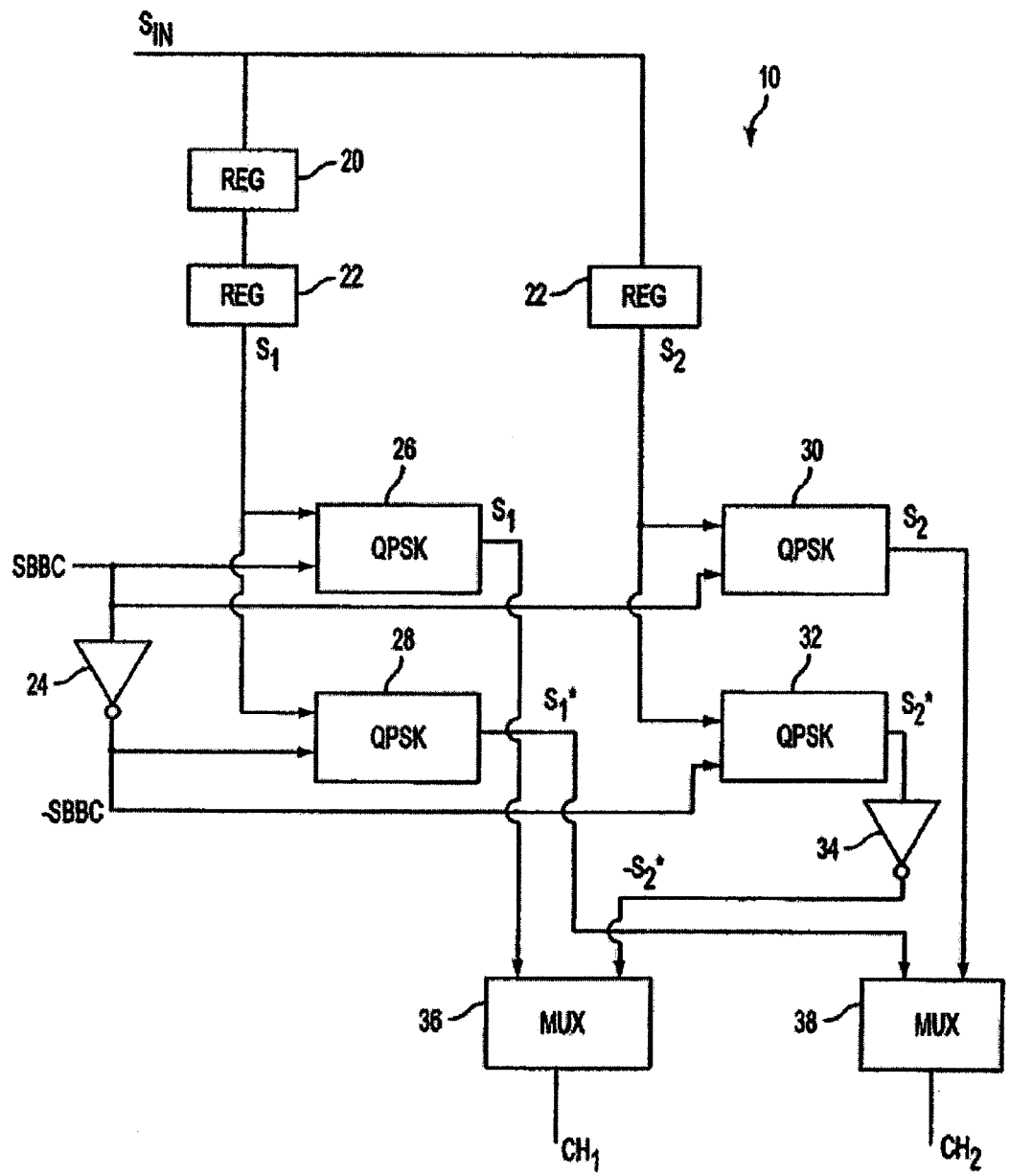
FIG. 3 is a block diagram of a known space time encoder.
Figure 26:
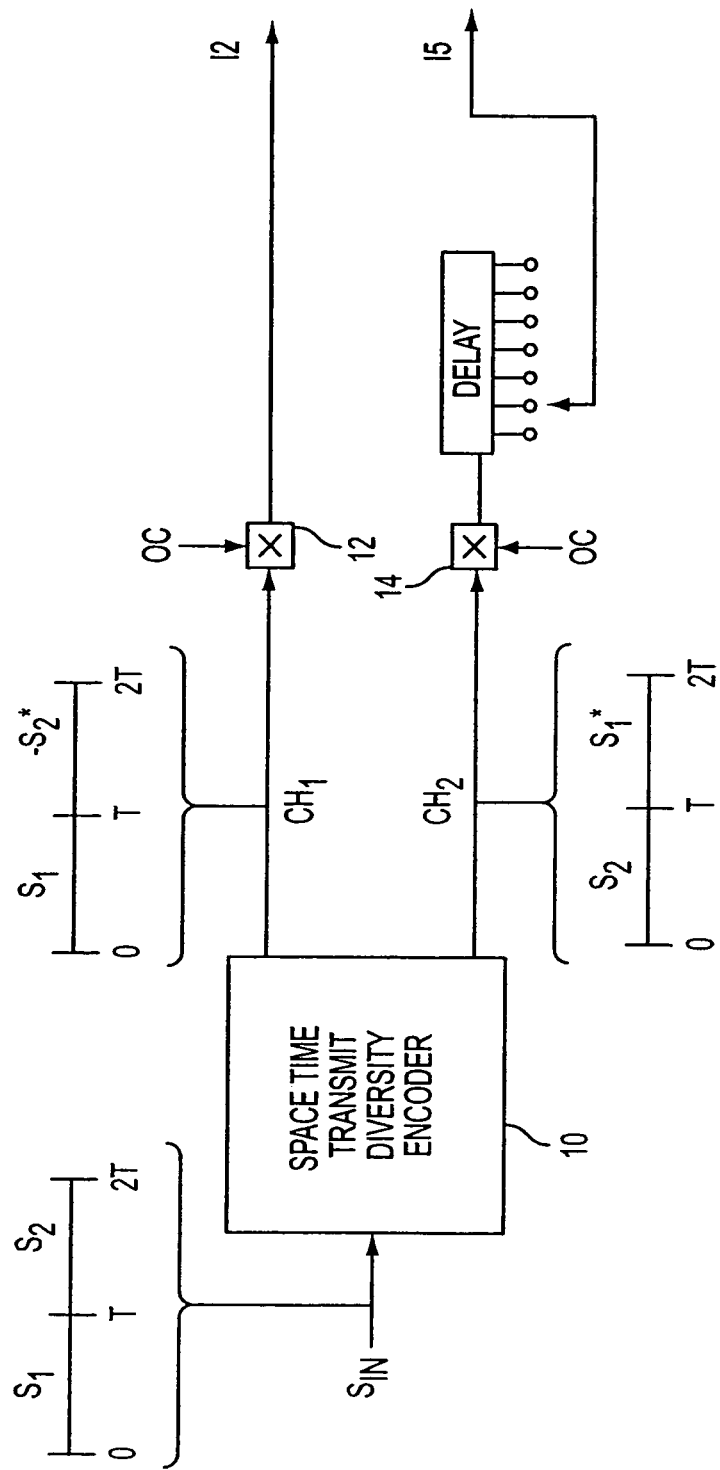
FIG. 26 is a block diagram of a base station apparatus with a programmable delay line according to an embodiment of the present invention.

In FIG. 26, an exemplary encoder for the generation of space-time coded signals I2 and I5 is depicted. FIG. 26 is similar to FIG. 2, except that antennas 16 and 18 of FIG. 2 are replaced by the multi-beam antenna of FIG. 23 and a programmable delay line (e.g., a selectable multi-tap delay line) is coupled between multiplier 14 and the multi-beam antenna. Multiplier 12 encodes signal CH1 with a signature code (OC) that is mutually orthogonal to the signature code that is encoded in the signal CH2 by multiplier 14. The signature codes may be variously orthogonal training sequences, pilot codes or spreading sequences. Using these signature codes, remote station 2 separates the signal that is received in a direct path from beam D5 from the signal that is received in an indirect path from beam D2 as long as the signature codes remain orthogonal. Persons skilled in the art will appreciate that the two beams and corresponding space-time coded signals depicted in FIGS. 23 and 26 may be generalized to more than two and that additional programmable delay lines may be needed to time synchronize all signals.

Figure 24:
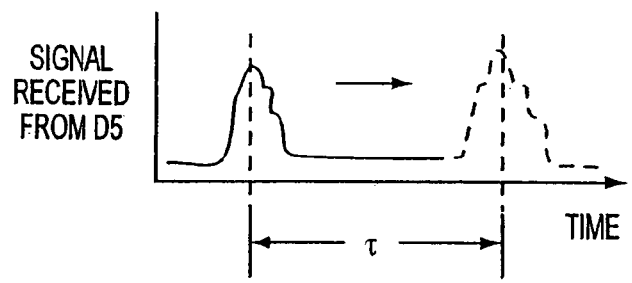
FIG. 24 is a graph showing the direct signal and a delayed replica of the direct signal of FIG. 21 or 23 that is received by a remote station.
Figure 25:
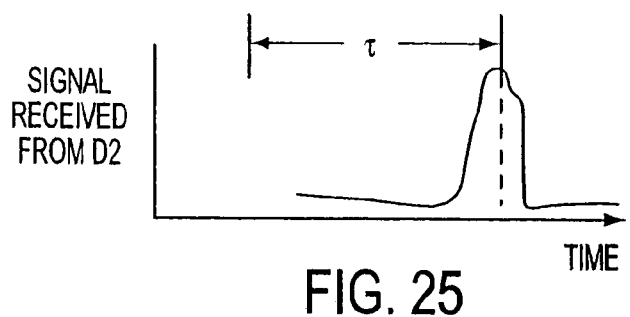
FIG. 25 is a graph showing the multi-path signal of FIG. 21 or 23 that is received by a remote station.

The direct signal from beam D5 is received at remote station 2 before the indirect signal from beam D2 is received by a time .tau. as depicted in FIGS. 24 and 25. In order to maintain the best orthogonality between the signature codes, it is desirable to align the signals in time. A receiver (possibly at the base station and possibly at remote station 2 as discussed below) determines the time delay τ necessary to align the signals. The last signal received at remote station 2 (e.g., signal I2) may be regarded as a reference space-time coded signal. The remaining signals may then be regarded as at least one remaining space-time coded signal (e.g., signal I5). In this embodiment, at least one remaining space-time coded signal is delayed in the programmable delay line of the base station (see FIG. 26) before being transmitted. The signal or signals is or are delayed by a sufficient delay to ensure that each of the at least one remaining space-time coded signal will align in time with the reference signal when received at the remote station. In the example depicted in FIG. 23, the last signal received at remote station 2 is signal I2 due to the extended length of multi-path 5. Signal I5 will need to be delayed so that it will arrive at remote station 2 at the same time that signal I2 arrives at remote station 2.

In both the space-time diversity technology (FIG. 2) and the beam-space diversity (FIG. 23), it is important for the remote receiver to separate signals CH1 and CH2 as discussed above. This is achieved by using orthogonal signature codes in various forms. The difference in time of arrival when the signals from the two paths, direct path 3 and multi-path 5, arrive at remote station 2 is referred to as the delay spread. When the delay spread does not exist or is minimal, the orthogonality of the signature codes is preserved. However, in frequency selective channels where there exists a considerable delay spread of the signature codes, the orthogonality between the channels may be lost, and remote station 2 will find it difficult to separate signals carried in the respective channels. Most common coding sequences are characterized by non-ideal cross-correlation functions (CCFs) which have a low or zero value only for a given phase relationship between the signature codes, and for other phase relationships, the CCFs are non-zero.

Plural space-time diversity signals intended for transmission to remote station 2 over multi-path channels will undergo different delays. Because the value of the CCF at a given out-of-phase position is typically non-zero and different from position to position, the effect of different path delays imposed by the radio channels on the transmitted signals will be to diminish the orthogonality between the signature codes used by remote station 2 to separate the signals. This loss of orthogonality results in a deterioration in the diversity gain that would otherwise be achieved by the space-time code transmission of signals between a base station and a remote station in a wireless communication system.

In the present embodiment, a multi-beam antenna array associated with the base station receives an up link signal from the remote station of interest in each of the plural beams of the multi-beam antenna array. The up link signal may be a pilot signal, an up link signaling channel, or any other up link channel that identifies the source of the signal as the remote station of interest. The up link signal is received as plural signals derived from radio signals received in corresponding plural beams of the multi-beam antenna array.

For each of the plural received signals, a receiver at the base station separates a signal component identified by a signature code as originating at the particular remote station of interest. The received signal component of each of the plural beams includes a replica of the identified signal for the particular remote station of interest at a particular time delay or delay spread relative to the signal component of a reference beam. A receiver at the base station processes the plural signal components from their respective beams to identify a reference beam as containing the last received signal component and a delay spread needed to align each of the other signal components received from their respective beams with the signal component received in the reference beam. When the base station serves more than one remote station, this process can be repeated for each remote station or for selected remote stations. The selected remote stations could be those with high transmit power. High transmit power might be required by, for example, high data rate requirements.

Figure 27:
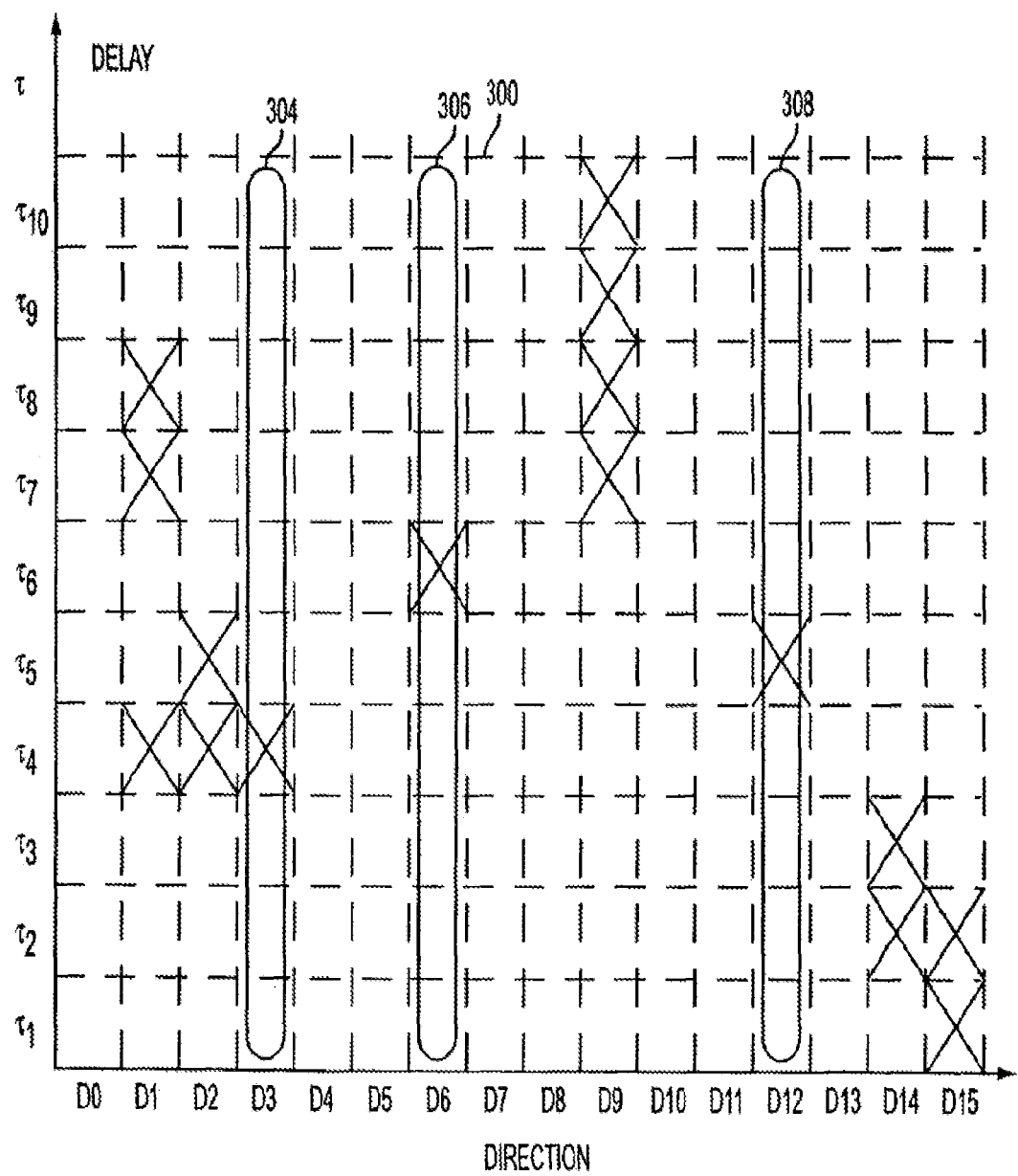
FIG. 27 is a graph depicting a delay distribution profile according to the invention.

FIG. 27 depicts a representative channel impulse response or delay distribution profile 300 for a 16 beam base station system that is similar to the 8 beam base station system depicted in FIG. 23. The base station measures the delay spreads $\tau$ associated with each beam of the multi-beam antenna. For signals received that have signal strengths above a threshold, an "x" indicates instantaneous and/or averaged signal strength exceeding a given threshold. Directions D3, D6 and D12 depicted at 304, 306 and 308 respectively, include signals with a minimum delay spread (e.g., spanning delays $\tau_4$ through $\tau_6$. If several potential directions are available, preferred directions among the available directions are selected based on additional criteria, such as the whitening of generated interference, the even distribution of power in the plurality of power amplifiers used by the base station and the avoidance of directions where greater than average interference could be caused to co-channel users. For example, a high power beam could cause interference to one or many low bit rate users if the low bit rate users are located within the area illuminated by the high power beam. In some favorable situations, beam hopping can also be applied in order to achieve more effective interference whitening.

In operation, the base station selects directions having minimal delay spreads. For example, the base station selects at least two beams of plural beams that may be formed by the multi-beam antenna array for transmission of at least two space-time coded signals in corresponding beams of the at least two beams. The at least two beams include a reference beam and at least one remaining beam. The base station also determines from delay distribution profile 300 a time delay corresponding to each beam of the at least one remaining beam for use in programming the programmable delay line.

The base station encodes each signal of the at least two space-time coded signals with a signature code that is mutually orthogonal to each other signature code encoded in the at least two space-time coded signals so as to form a reference space-time coded signal and at least one remaining space-time coded signal (see I2 and I4 of FIG. 26). In the example of FIG. 23, the reference space-time coded signal may be regarded as signal I2 and the at least one remaining space-time coded signal may be regarded as signal I5. However, persons skilled in the art will appreciate in light of these teachings how to extend the present embodiment to more than two space-time coded signals.

The base station delays each signal of the at least one remaining space-time coded signal to form at least one delayed space-time coded signal (e.g., signal I5 in FIG. 26). The base station then transmits the reference space-time coded signal (e.g., signal I2) and the at least one delayed space-time coded signal (e.g., signal I5) in respective beams of the at least two beams so that both the reference space-time coded signal and the at least one remaining space-time coded signal arrive at remote station 2 at the same time.

The present embodiment does not rely on a feedback channel from the remote station to the base station. Instead, directions of transmission are selected by the base station solely from up link measurements of normal signaling signals. By averaging the up link channel response over a long time to mitigate fast fading, the power response of the down link channel response can be estimated. The indicated up link and down link channels are reciprocal in the power sense.

However, in frequency division duplex (FDD) systems, a feedback measurement could provide improved results at the cost of additional complexity. In frequency division duplexed systems where up link and down link communications are carried out over different frequencies, it is not possible to exactly determine the down link channel state from up link information since the two directions are based on different frequencies.

The just described embodiment describes an embodiment where the base station measures the up link channel response as a surrogate for the down link channel response. To obtain the complete down link channel impulse response, it is necessary to measure the down link channel directly, and send the down link channel information in a feedback channel from the remote station that does the measuring to the base station that needs the measurements (e.g., delay distribution profile 300).

Rather than performing the calculation required for direction selection and delay in the base station, the remote station participates in or performs these functions. An agreed upon standard signal is sent from the base stations to all remote stations with an identifier or signature coded encoded in each beam, such as mutually orthogonal pilot or training sequences or spreading codes. The remote station would then measure the channel impulse response (e.g., delay distribution profile 300) and inform the base station of the preferred directions and delays for transmission.

Persons skilled in the art will appreciate in light of these teachings that the channel performance may be measured in a two step process. In the first step, the base station makes an estimate of the up link channel's impulse response and uses this estimate as a surrogate for the down link channel's impulse response. Then, the base station applies the delays to the at least one remaining space-time coded signal that are indicated by the first estimate process.

In the second step, the down link channel is measured directly. An agreed upon standard signal is sent from the base station to all remote stations with an identifier or signature coded encoded in each beam, such as mutually orthogonal pilot or training sequences or spreading codes. The remote station would then measure the channel impulse response (e.g., delay distribution profile 300) and inform the base station over a feedback channel of the preferred directions and delays for transmission.

Figure 28:
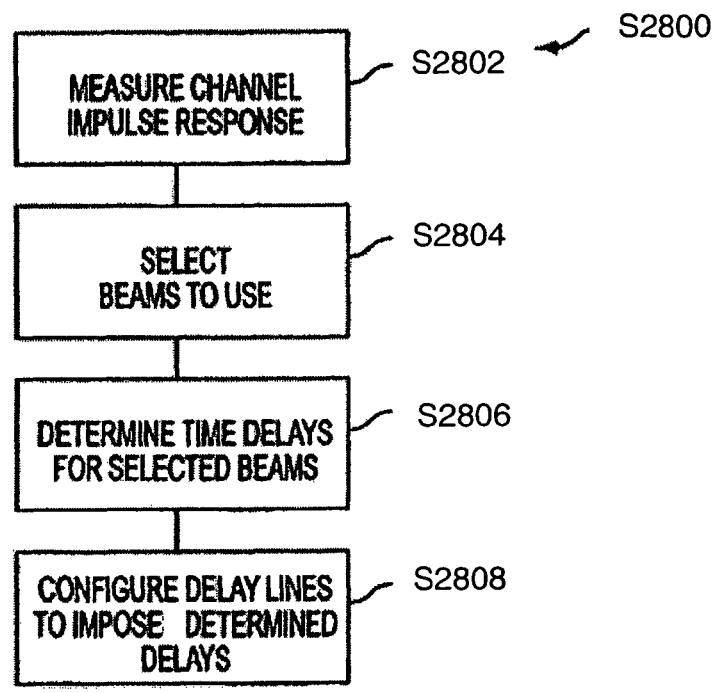
FIG. 28 is a flow chart of a set up method according to the present invention.

In FIG. 28, set up process S2800 measures the up link channel response and sets the measured delays to control the down link channel transmission. Process S2800 includes step S2802 to measure the channel response, step S2804 to select beams to use, step S2806 to determine time delays for the selected beams, and step S2808 to configure variable delay lines in the base station (see FIG. 26) to impose the determined delays. The variable delay lines may be constructed from a sequence of fixed delay elements with multiple taps disposed between the elements. The delay line is varied by selecting different taps as an output using a switch. In step S2804, the base station selects at least two beams of plural beams formed by a multi-beam antenna array associated with a base station (although only two beams are shown in FIGS. 23 and 26). In the beams are transmitted corresponding at least two space-time coded signals produced by a space-time encoder (although only two signals are shown in FIGS. 23 and 26). The at least two beams include a reference beam and at least one remaining beam. In step S2806, the base station determines a time delay corresponding to each beam of the at least one remaining beam. In step S2808, the base station sets into a variable delay line the time delay corresponding to each beam of the at least one remaining beam. Each variable delay line is coupled between the multi-beam antenna array and the space-time encoder (see FIG. 26).

Figure 29:
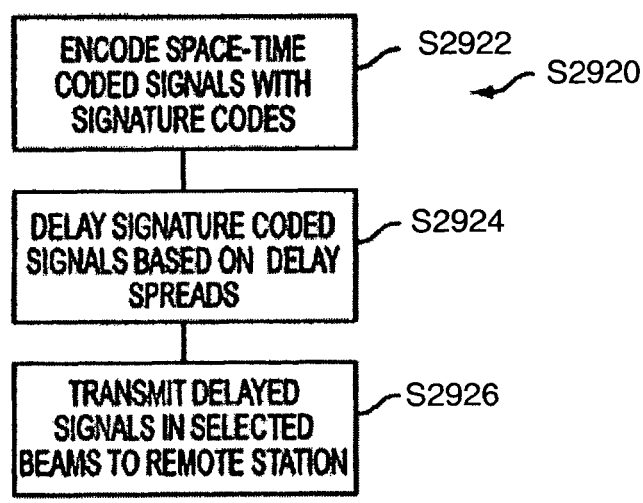
FIG. 29 is a flow chart of a time align method according to the present invention.

In FIG. 29, time align process S2920 marks the space-time coded signal for each selected beam with a signature code orthogonal to all other beams in step S2922, delays selected beams according to determined delay spreads in step S2924 and transmits the delayed signals to the base station in step S2926. In step S2922, the base station encodes each signal of the at least two space-time coded signals with a signature code that is mutually orthogonal to each other signature code encoded in the at least two space-time coded signals so as to form a reference space-time coded signal and at least one remaining space-time coded signal. In step S2924, the base station delays each signal of the at least one remaining space-time coded signal in a respective variable delay line to form at least one delayed space-time coded signal. In step S2926, the base station transmits the reference space-time coded signal and the at least one delayed space-time coded signal in respective beams of the at least two beams.

Figure 30:
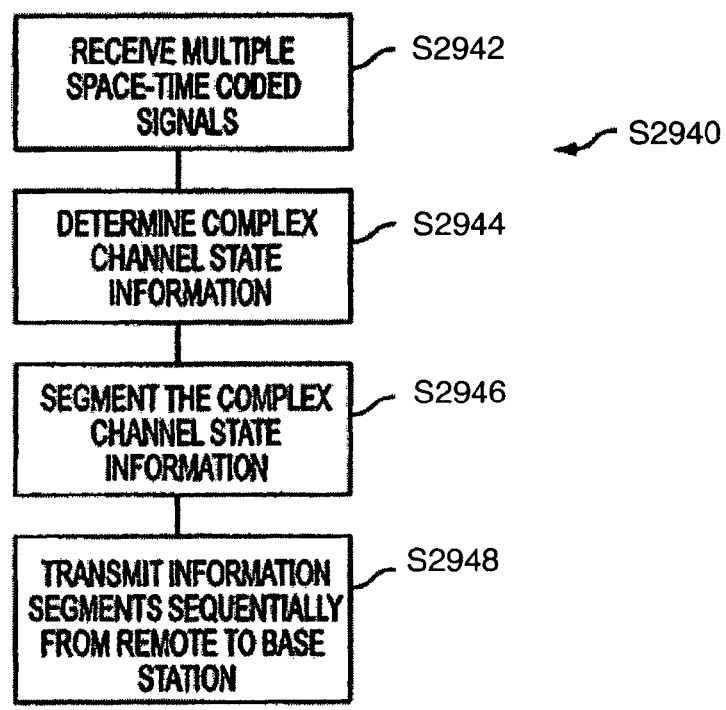
FIG. 30 is a flow chart of a method of feedback according to the present invention.

In FIG. 30, a remote station using feedback process S2940 measures down link complex channel state information and feeds this information back to the base station. Process S2940 includes step S2942 to receive at least two identifier signatures (e.g., different pilot signals) from an antenna system associated with a base station, step S2944 to determine complex channel state information based on the received signals, step S2946 to segment the complex channel state information into a plurality of channel state information segments, and step S2948 to send the plurality of channel state information segments in a sequence to the base station. The sequence of segments sends the most significant bits of the phase angle before the least significant bits of the phase angle. The sequence of segments sends the most significant bits of the amplitude before the least significant bits of the amplitude. The sequence of segments sends a bit of the phase angle before a corresponding bit of amplitude having the same level of bit significance. It is noted that for feedback of the channel impulse response measurements, each beam (or antenna) should be associated with a unique pilot signature that is orthogonal to all other pilot signatures.

It will be appreciated by persons skilled in the art in light of these teachings that various system components may be implemented in electrical circuitry, special application specific integrated circuits (ASICs) or computers or processors that executed software programs or use data tables. For example, encoder 10, multipliers 12, 14 and amplifiers 102, 104 of FIG. 4, 5, 11 or 12 may be implemented in circuitry or ASICs or in some cases, software controlled processors, depending on performance requirements. Beam former 40 of FIG. 11 is typically implemented in circuitry or ASICs and modulators 101, 103 and multiplexers 105, 107 are typically implemented in circuitry or ASICs but may be implemented in software controlled processors. Various base station components 212, 214, 216, 218, 220 and 222 and various remote station components 232, 234, 238, 240 and 242 of FIG. 14 may be implemented in circuitry or ASICs but may be implemented in software controlled processors. Various base station components 16D, 18D, 102, 104, 220 and 220P and various remote station components 232, 233, 234, 238, 240 and 242 of FIG. 19 may be implemented in circuitry or ASICs but may be implemented in software controlled processors. It will be appreciated by persons skilled in the art that the various functions described herein may be implemented in circuitry, ASICs or in software controlled processors as the performance requirement dictate.

Having described preferred embodiments of a novel closed loop feedback system for improved down link performance (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by Letters Patent is set forth in the appended claims.

What is claimed is:

1. A method comprising:
receiving from a first station at a second station at least two space-time coded signals in respective formed beams of a multi-beam antenna array associated with the first station;
receiving from the first station, in a signaling channel, a value representing a transmit power level;
determining power control coefficients for each of the space-time coded signals; and
transmitting the power control coefficients to the first station, wherein the control coefficients are for in part adjusting transmit power.

2. The method of claim 1, wherein each power control coefficient is proportional to a received power related to a space-time coded signal divided by the received transmit power level related to the space-time coded signal.

3. An apparatus comprising:
a receiver configured to receive from a first station at least two space-time coded signals in respective formed beams of a multi-beam antenna array associated with the first station, wherein the receiver is further configured to receive from the first station, in a signaling channel, a value representing a transmit power level;
a processor configured to determine power control coefficients for each of the space-time coded signals; and
a transmitter configured to transmit the power control coefficients to the first station, wherein the power control coefficients are for in part adjusting transmit power.

4. The apparatus of claim 3, wherein each power control coefficient is proportional to a received power related to a space-time coded signal divided by the received transmit power level related to the space-time coded signal.

5. An article of manufacture including a non-transitory computer-readable medium having instructions stored thereon that, if executed by a computing device, cause the computing device to perform operations comprising:
receiving from a first station at a second station at least two space-time coded signals in respective formed beams of a multi-beam antenna array associated with the first station;
receiving from the first station, in a signaling channel, a value representing a transmit power level;
determining power control coefficients for each of the space-time coded signals; and
transmitting the power control coefficients to the first station, wherein the power control coefficients are for in part adjusting transmit power.

6. The article of manufacture of claim 5, wherein each power control coefficient is proportional to a received power related to a space-time coded signal divided by the received transmit power level related to the space-time coded signal.

7. A method comprising:
- transmitting from a first station to a second station at least two space-time coded signals in respective formed beams of a multi-beam antenna array associated with the first station,
- transmitting from the first station, in a signaling channel, a value representing a transmit power level;
- receiving, at the first station, power control coefficients for each of the space-time coded signals; and
- adjusting, at the first station, transmit powers of the space-time coded signals in part on the received power control coefficients.

8. The method of claim 7, wherein adjusting transmit powers includes comparing the received power control coefficients.

9. An apparatus comprising:
- a transmitter configured to transmit to a second station at least two space-time coded signals in respective formed beams of a multi-beam antenna array associated with the apparatus, the transmitter further configured to transmit, in a signaling channel, a value representing a transmit power level; and
- a receiver coupled to the transmitter and configured to receive power control coefficients for each of the space-time coded signals;
- wherein the transmitter is further configured to adjust the transmit powers of the space-time coded signals in part on the power control coefficients received at the receiver.

10. The apparatus of claim 9 further comprising a processor configured to compare the received power control coefficients.

11. An article of manufacture including a non-transitory computer-readable medium having instructions stored thereon that, if executed by a computing device, cause the computing device to perform operations comprising:
- transmitting from a first station to a second station at least two space-time coded signals in respective formed beams of a multi-beam antenna array associated with the first station,
- transmitting from the first station, in a signaling channel, a value representing a transmit power level;
- receiving, at the first station, power control coefficients for each of the space-time coded signals; and
- adjusting, at the first station, transmit powers of the space-time coded signals in part on the received power control coefficients.

12. The article of manufacture of claim 11 further including instructions that, if executed by a computing device, cause the computing device to perform operations comprising comparing the received power control coefficients.

13. A method comprising:
- transmitting to a first station from a second station at least two space-time coded signals in respective formed beams of a multi-beam antenna array associated with the first station, the beams having a signature code embedded in each respective space-time coded signal, the signature codes being orthogonal so that the second station separates and measures a channel impulse response corresponding to each space-time coded signal; and
- receiving an indicia of a set of least attenuated signals from the second station, wherein the indicia is for in part re-forming the formed beams.

14. The method of claim 13 further comprising selecting at least two beams for transmission based on the indicia received from the second station.

15. The method of claim 14, further including transmitting the at least two space-time coded signals in the selected at least two beams.

16. An apparatus comprising:
- a transmitter configured to transmit to a second station at least two space-time coded signals in respective formed beams of a multi-beam antenna array associated with the apparatus, the beams having a signature code embedded in each respective space-time coded signal, the signature codes being orthogonal so that a second station separates and measures a channel impulse response corresponding to each space-time coded signal;
- a receiver configured to receive an indicia of a selected set of least attenuated signals from the second station, wherein the indicia is for in part re-forming the formed beams.

17. The apparatus of claim 16 further comprising a processor configured to select at least two beams for transmission from the first station based on the received indicia received from the second station.

18. The apparatus of claim 17, wherein the transmitter is further configured to transmit the at least two space-time coded signals in the selected at least two beams.

19. An article of manufacture including a non-transitory computer-readable medium having instructions stored thereon that, if executed by a computing device, cause the computing device to perform operations comprising:
- transmitting from a first station to a second station at least two space-time coded signals in respective formed beams of a multi-beam antenna array associated with the first station, the beams having a signature code embedded in each respective space-time coded signal, the signature codes being orthogonal so that the second station separates and measures a channel impulse response corresponding to each space-time coded signal; and
- receiving an indicia of a set of least attenuated signals from the second station, wherein the indicia is for in part re-forming the formed beams.

20. The article of manufacture of claim 19 further including instructions that, if executed by a computing device, cause the computing device to perform operations comprising selecting at least two beams for transmission from the first station based on the received indicia received from the second station.

21. The article of manufacture of claim 20 further including instructions that, if executed by a computing device, cause the computing device to perform operations comprising transmitting the at least two space-time coded signals in the selected at least two beams.

22. An apparatus comprising:
- a receiver configured to receive from a first station at least two space-time coded signals in respective formed beams of a multi-beam antenna array associated with the first station, the beams having a signature code embedded in each respective space-time coded signal, the signature codes being orthogonal so that a second station separates and measures a channel impulse response corresponding to each space-time coded signal;
- a processor configured to:
  - measure the channel impulse response for each space-time coded signal at the second station;
  - determining, from the received space-time coded signals, a selected set of least attenuated signals and a remaining set of most attenuated signals at the second station; and a transmitter configured to send an indicia of the selected set of least attenuated signals to the first station, wherein the indicia is for in part re-forming the formed beams.

23. The apparatus of claim 22, wherein the processor is further configured to determine complex channel state information based on the received space-time coded signals.

24. The apparatus of claim 23, wherein the transmitter is further configured to send the determined complex channel state information to the first station.

25. The apparatus of claim 24, wherein the determined complex channel state information includes at least one weight.

26. The apparatus of claim 25, wherein each weight includes amplitude and phase angle information.

27. An article of manufacture including a non-transitory computer-readable medium having instructions stored thereon that, if executed by a computing device, cause the computing device to perform operations comprising:

receiving from a first station at a second station at least two space-time coded signals in respective formed beams of a multi-beam antenna array associated with the first station, the beams having a signature code embedded in each respective space-time coded signal, the signature codes being orthogonal so that the second station separates and measures a channel impulse response corresponding to each space-time coded signal;

measuring the channel impulse response for each space-time coded signal at the second station;

determining, from the received space-time coded signals, a selected set of least attenuated signals and a remaining set of most attenuated signals at the second station; and sending an indicia of the selected set of least attenuated signals from the second station to the first station, wherein the indicia is for in part re-forming the formed beams.

28. The article of manufacture of claim 27, further including instructions that, if executed by a computing device, cause the computing device to perform operations comprising determining, at the second station, complex channel state information based on the received space-time coded signals.

29. The article of manufacture of claim 28, further including instructions that, if executed by a computing device, cause the computing device to perform operations comprising sending the determined complex channel state information to the first station.

30. The article of manufacture of claim 29, wherein the determined complex channel state information includes at least one weight.

31. The article of manufacture of claim 30, wherein each weight includes amplitude and phase angle information.

* * * * *